(12) United States Patent
Hara

(10) Patent No.: US 7,537,291 B2
(45) Date of Patent: May 26, 2009

(54) BICYCLE WHEEL SECURING STRUCTURE

(75) Inventor: Nobukatsu Hara, Izumisano (JP)

(73) Assignee: Shimano Inc., Osaka (JP)

( * ) Notice: Subject to any disclaimer, the term of this patent is extended or adjusted under 35 U.S.C. 154(b) by 50 days.

(21) Appl. No.: 11/670,243

(22) Filed: Feb. 1, 2007

(65) Prior Publication Data

US 2008/0185908 A1  Aug. 7, 2008

(51) Int. Cl.
*B60B 35/00* (2006.01)

(52) U.S. Cl. ............. 301/124.2; 301/110.5; 403/374.1; 403/374.5

(58) Field of Classification Search ............. 301/110.5, 301/110.6, 124.2; 403/374.1, 374.2, 374.3, 403/374.4, 374.5; 280/279, 288
See application file for complete search history.

(56) References Cited

U.S. PATENT DOCUMENTS

| | | | | |
|---|---|---|---|---|
| 4,789,206 A | * | 12/1988 | Ozaki | 301/124.2 |
| 5,022,672 A | * | 6/1991 | Kawai | 280/281.1 |
| 5,135,330 A | * | 8/1992 | Chen | 403/374.5 |
| 5,567,020 A | * | 10/1996 | Phillips et al. | 301/124.2 |
| 5,823,555 A | * | 10/1998 | Ashman | 280/279 |
| 6,089,675 A | | 7/2000 | Schlanger | |
| 6,409,281 B1 | * | 6/2002 | Kanehisa et al. | 301/110.5 |
| 6,435,622 B1 | | 8/2002 | Kanehisa et al. | |
| 6,761,417 B2 | * | 7/2004 | Denby | 301/124.2 |
| 2005/0110335 A1 | | 5/2005 | Rose et al. | |

FOREIGN PATENT DOCUMENTS

| | | | |
|---|---|---|---|
| EP | 1-213-158 A2 | 6/2002 | |
| EP | 1-437-235 A2 | 7/2004 | |
| EP | 0 890 505 B1 | 11/2004 | |
| EP | 1-602-570 A1 | 12/2005 | |
| JP | 2-212201 | * | 8/1990 |
| WO | WO-2005/120940 A1 | 12/2005 | |

* cited by examiner

*Primary Examiner*—Russell D Stormer
(74) *Attorney, Agent, or Firm*—Global IP Counselors, LLP

(57) ABSTRACT

A bicycle wheel securing structure includes a shaft member, a head member, a lever member and an adjustment member. The shaft member has a first threaded end and a second end with a center axis extending therebetween. The head member is disposed on the second end of the shaft member. The lever member is operatively mounted between the shaft member and the head member to move the shaft member in an axial direction relative to the head member in response to movement of the lever member. The adjustment member is axially adjustably coupled to the head member such that an axial position of an abutment surface of the adjustment member can be adjusted relative to the shaft member.

16 Claims, 17 Drawing Sheets

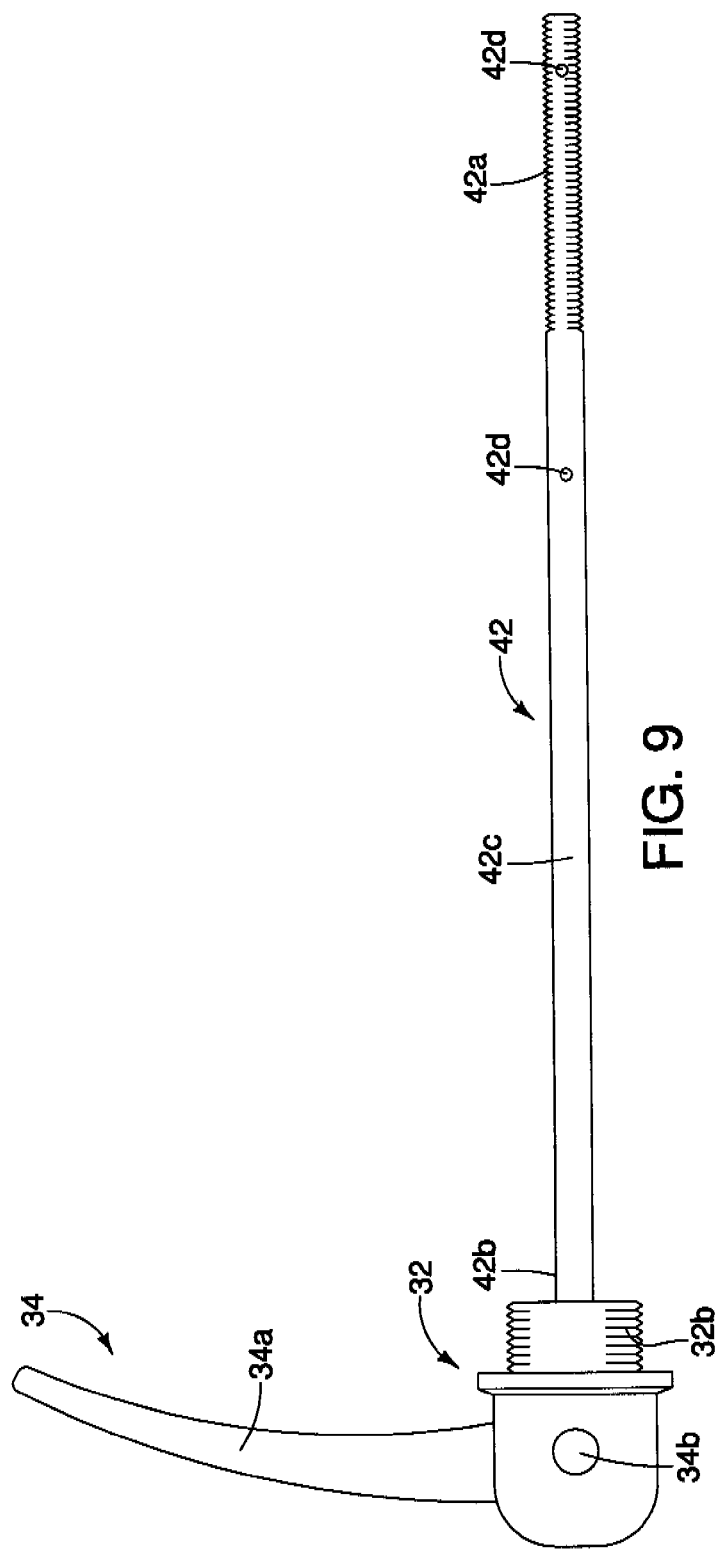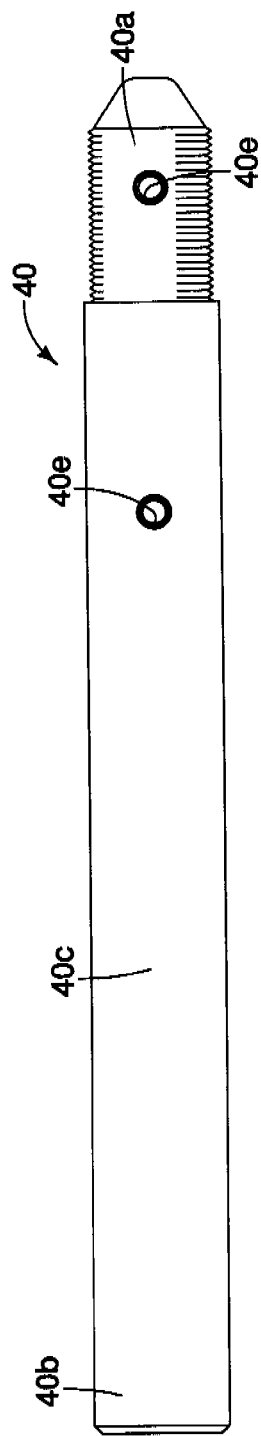
FIG. 9
FIG. 10

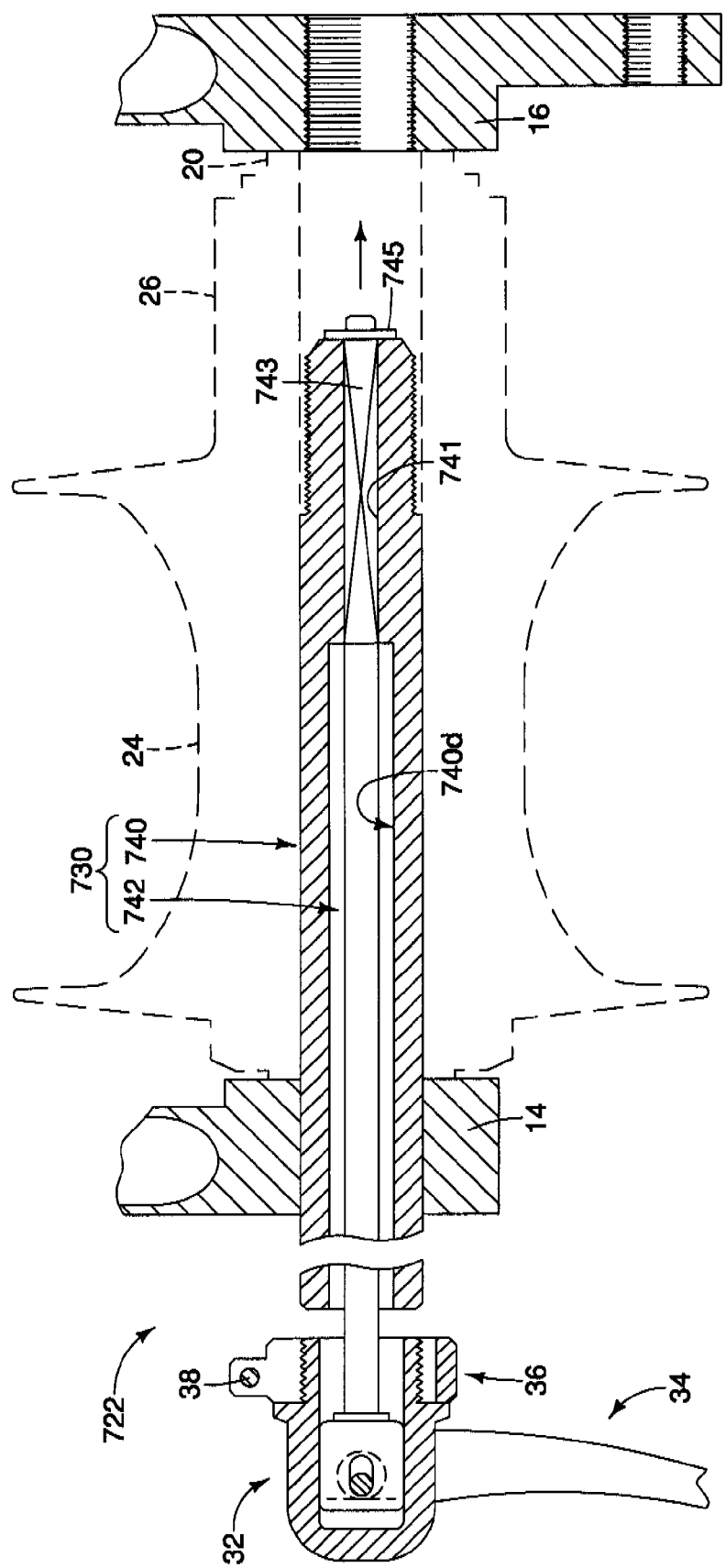
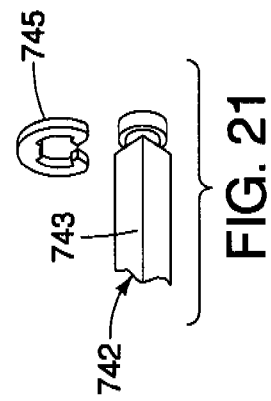
FIG. 20
FIG. 21

BICYCLE WHEEL SECURING STRUCTURE

BACKGROUND OF THE INVENTION

1. Field of the Invention

This invention generally relates to a bicycle wheel securing structure. More specifically, the present invention relates to a bicycle wheel securing structure, which includes an adjustment member that is axially adjustable relative to the head member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle quick release mechanism.

In the past various bicycle parts have been attached using nut and bolt arrangements. However, while certain bicycle parts are designed to be permanently attached to the bicycle, other bicycle parts such as bicycle wheels need to be loosened and removed relatively often. For example, bicycle wheels need to be removed from the frame whenever there is a flat tire. Moreover, bicycle wheels often need to be removed in order to transport a bicycle in an automobile.

Due to the need to remove and reinstall bicycle wheels, bicycle wheel hubs have been provided with quick release mechanisms in order to facilitate easier removal and reinstallation of the wheels. A typical quick release device includes a skewer with a threaded end having a quick release member mounted at the other end. The quick release member includes a base with a lever and a cam structure. A nut is detachably threaded onto the threaded end of the skewer after the skewer is inserted through the hub body. The fork flanges of the frame are arranged adjacent the base of the quick release member and the hub body and between the nut and the hub body, respectively. Thus, the hub can be attached to the frame by clamping the fork flanges using the quick release lever. While these typical quick release mechanisms generally work well, a tighter connection between the hub and frame has been in demand for some riders.

Thus, bicycle hubs have been designed with an axle that threadedly attaches directly to the bicycle frame. With this type of hub, a knob is provided on the end of the hub axle opposite the threaded end. The knob is used to rotate the axle during installation to both tighten the axle to the frame and to clamp one fork flange between the knob and the hub. With this type of hub, a tighter connection between the hub and the frame is possible as compared to typical quick release hubs. However, it can be difficult for some individuals to tighten such a knob. Specifically, with this type of hub, the tightness of the connection between the hub and the frame at least partially depends on the individual installing the hub (i.e., the strength of the individual). Individuals that have difficulty tightening the knob to the desired tightness level may even need a tool in order to achieve the desired level of tightness.

In view of the above, it will be apparent to those skilled in the art from this disclosure that there exists a need for an improved bicycle wheel securing structure. This invention addresses this need in the art as well as other needs, which will become apparent to those skilled in the art from this disclosure.

SUMMARY OF THE INVENTION

One object of the present invention is to provide a bicycle wheel securing structure, which provides a tight connection, yet is relatively easy to tighten.

Another object of the present invention is to provide a bicycle wheel securing structure, which is relatively simple and inexpensive to manufacture and/or assemble.

The foregoing objects can basically be attained by providing a bicycle wheel securing structure, which comprises a shaft member, a head member, a lever member and an adjustment member. The shaft member has a first threaded end and a second end with a center axis extending therebetween. The head member is disposed on the second end of the shaft member. The lever member is operatively mounted between the shaft member and the head member to move the shaft member in an axial direction relative to the head member in response to movement of the lever member. The adjustment member is axially adjustably coupled to the head member such that an axial position of an abutment surface of the adjustment member can be adjusted relative to the shaft member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 9 is a longitudinal elevational view of the inner axle of the wheel securing axle illustrated in FIGS. 2-8;

FIG. 10 is a longitudinal elevational view of the outer axle of the wheel securing axle illustrated in FIGS. 2-8;

FIG. 20 is an enlarged, partial cross-sectional view of a portion of a frame and a rear hub with a wheel securing axle in accordance with a seventh embodiment of the present invention, with the wheel securing axle in a first, partially installed position;

FIG. 21 is an enlarged, partial perspective view of parts of the wheel securing axle illustrated in FIG. 20;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
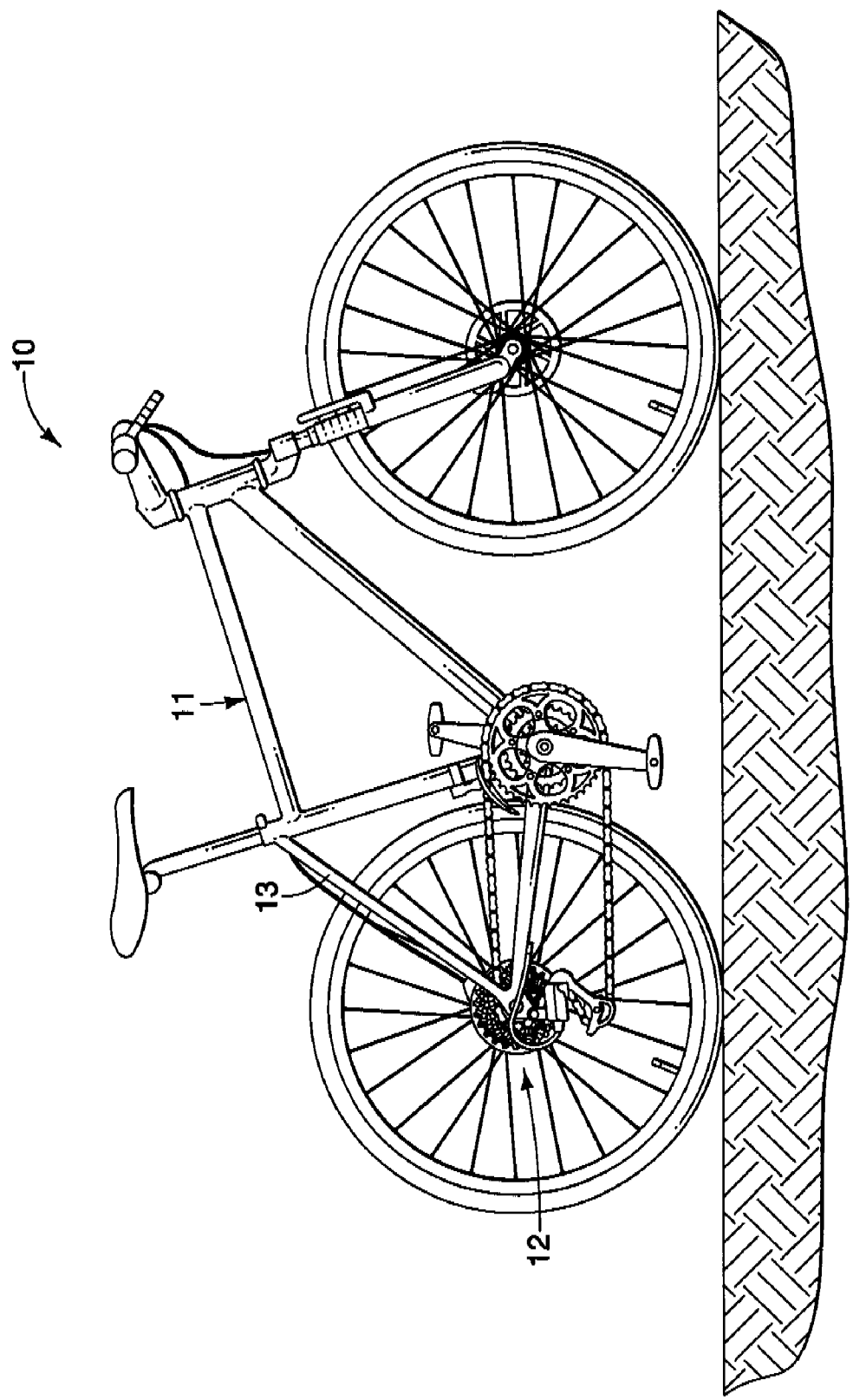
FIG. 1 is a side elevational view of a bicycle with a rear bicycle hub coupled thereto in accordance with a first embodiment of the present invention.
Figure 2:
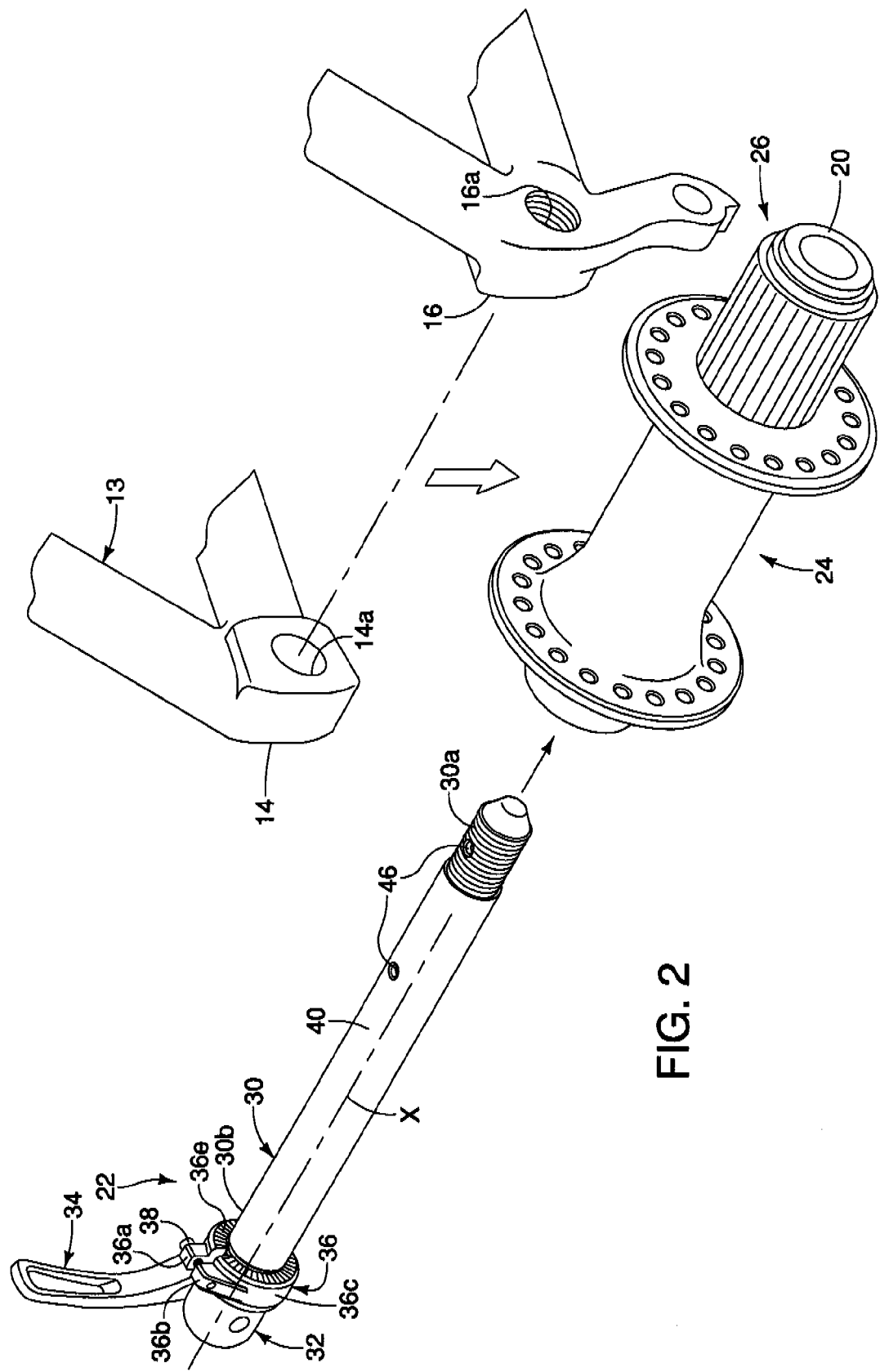
FIG. 2 is an enlarged, exploded perspective view of a portion of the frame and the rear hub illustrated in FIG. 1.

Referring initially to FIGS. 1 and 2, a bicycle 10 is illustrated, which has a rear bicycle hub 12 coupled thereto in accordance with a first embodiment of the present invention. The rear hub 12 is attached the frame 11 of the bicycle 10 using a wheel securing axle 22 in accordance with the present invention. Specifically, the frame 11 includes a rear fork or triangle 13 with a pair of hub mounting flanges 14 and 16 formed at the free ends thereof. Preferably, one end of the wheel securing axle 22 is directly threadedly attached to the mounting flange 16, while the other end has a wheel securing mechanism that is used to securely attach the quick release axle 22 to the other mounting flange 14.

The bicycle 10 is conventional, except for the rear hub 12 having the wheel securing axle 22. Accordingly, the bicycle 10 and its various components will not be discussed and/or illustrated in detail herein, except as related to the rear hub 12 and the wheel securing axle 22 of the present invention. Moreover, it will be apparent to those skilled in the bicycle art from this disclosure that various modifications can be made to the bicycle 10 and its components without departing from the present invention.

Referring to FIGS. 2-8, the rear bicycle hub 12 includes a main hub axle 20, the wheel securing axle 22, a hub assembly 24 and a freewheel 26. The rear hub 12 is conventional, except for the wheel securing axle 22. Accordingly, the rear hub 12 will not be discussed and/or illustrated in detail herein, except as related to the wheel securing axle 22 of the present invention. A hub shell (outline shown in broken lines) of the hub assembly 24 and the freewheel 26 are rotatably supported on the main hub axle 20 of the rear hub 12 via a bearing assembly and/or other conventional parts in a conventional manner. The wheel securing axle 22 extends through the main hub axle 20. Thus, forward rotation of rear sprockets mounted on the free wheel 26 transmits torque to the hub assembly 24. The hub assembly 24 is coupled to the rear rim via a plurality of spokes in a conventional manner to transmit the forward rotation of the hub assembly 24 to the rear rim (tire).

While the wheel securing axle 22 of the present invention is particularly suited for use with a rear hub such as the rear hub 12 disclosed herein, it will be apparent to those skilled in the bicycle art from this disclosure that the wheel securing axle 22 of the present invention could be used in other types of rear hubs (e.g. internally geared hubs) as well as in various front hubs.

Referring to FIGS. 2-13, the bicycle wheel securing axle 22 basically includes a shaft member 30, a head member 32, a lever member 34 and an adjustment member 36. The shaft member 30 has a first threaded end 30a and a second end 30b with a center axis X extending between the first and second ends 30a and 30b, as seen in FIGS. 2-5. A direction parallel to the center axis X will be considered an axial/longitudinal direction, while a direction perpendicular to the center axis X will be considered a transverse direction.

The first threaded end 30a is designed to be directly threadedly attached to the mounting flange 16. The second end 30b supports the head member 32. The lever member 34 is operatively mounted between the shaft member 30 and the head member 32 to move the shaft member 30 in an axial direction relative to the head member 32 in response to movement of the lever member 34. The adjustment member 36 is axially adjustably coupled to the head member 32 such that an axial position of the adjustment member 36 can be adjusted relative to the shaft member 30 and the head member 32, as explained below in more detail.

The shaft member 30 basically includes an outer axle 40 and an inner axle 42 releasably attached within the outer axle 40 in an installed position, as seen in FIGS. 4 and 6-8. The outer axle 40 and the inner axle 42 are preferably releasably attached together via a threaded connection 44 to releasably prevent axial removal of the inner axle 42 from the outer axle 40 when the inner axle 42 is in the installed position.

Referring to FIGS. 2-4, 6-8 and 10, the outer axle 40 basically includes a first externally threaded end 40a, a second end 40b, an outer rod portion 40c, an internal bore 40d and a pair of transverse threaded bores 40e. The threaded end 40a is preferably directly threadedly attached to the mounting flange 16. The second end 40b is attached to the mounting flange 14. The outer axle 40 preferably has a circular external shape, as viewed along the center axis X, as best understood from FIG. 3. The outer axle 40 is preferably constructed of a lightweight rigid material such as a metallic material utilizing conventional manufacturing techniques such as casting and/or machining. In this embodiment, the outer axle 40 is preferably constructed as a one-piece, unitary member.

Figure 8:
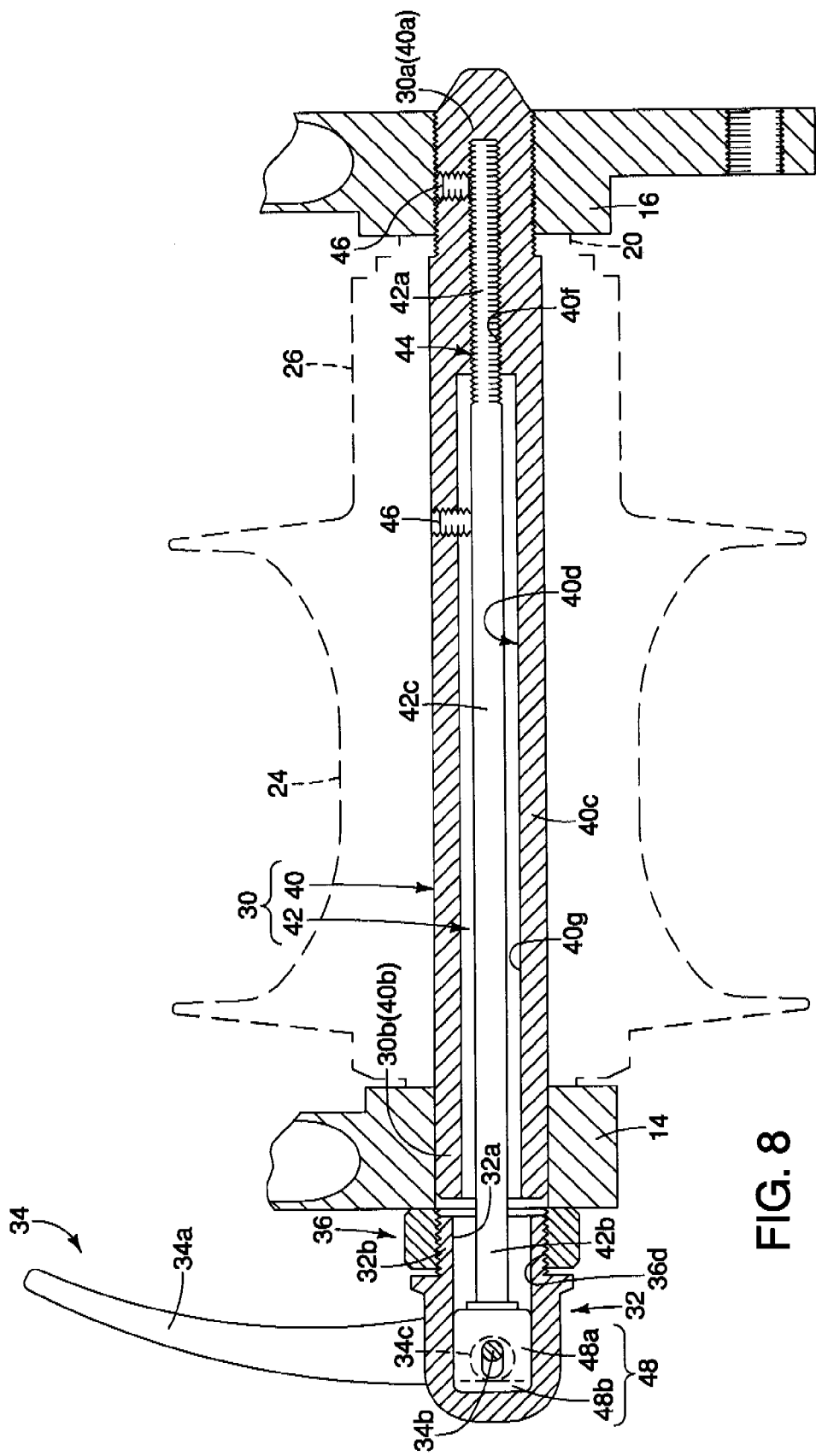
FIG. 8 is an enlarged, partial cross-sectional view of a portion of the frame and the rear hub illustrated in FIG. 1, with the wheel securing axle in a fully installed position after clamping the frame using the wheel securing lever.

The mounting flange 16 has a threaded bore 16a that is preferably a closed bore with a continuous annular female threads (i.e., preferably not a slot), which receives the first threaded end 40a. In this embodiment, the mounting flange 14 has an unthreaded bore 14a that is preferably a closed bore with a continuous annular surface (i.e., preferably not a slot), which receives the second end 40b. However, it will be apparent to those skilled in the bicycle art from this disclosure that outer axle 40 could be attached to a flange 14 having an open ended slot if needed and/or desired. The outer axle 40 of the shaft member 30 is preferably dimensioned and tightened to the mounting flange 16 such that the second end 40b of the outer axle 40 adjacent the head member 32 does not project beyond an outer axially facing surface of the mounting flange 14, as seen in FIG. 8.

The outer rod portion 40c extends between the first and second ends 40a and 40b, and preferably has an external surface which is illustrated as having a substantially uniform, circular shape. However, it will be apparent to those skilled in the bicycle art from this disclosure that the external surface of the outer rod portion 40c could have other configurations as needed and/or desired.

In this embodiment, the internal bore 40d is a stepped, blind bore with a threaded section 40f arranged at the first threaded end 40a of the outer axle 40 and an enlarged unthreaded section 40g extend from the threaded section 40e to an open end at the second end 40b. The inner axle 42 is threadedly attached to the threaded section 40f of the internal bore 40d. The inner axle 42 extends out of the unthreaded section 40g of the internal bore 40d. Thus, the inner axle 42 extends from the second end 40b of the outer axle 40 when the inner axle 42 is in the installed position. The head member 32 is preferably attached to an end of the inner axle 42 extending out of the internal bore 40d, as explained below. The stepped internal bore 40d preferably has a circular internal shape, as viewed along the center axis X.

One or more set screws 46 are preferably threadedly mounted in the transverse threaded bores 40e to releasably prevent relative rotation of the inner axle 42 within the internal bore 40d when the inner axle 42 is in the installed position, as explained below. Thus, the set screws 46 are preferably disposed between the outer axle 40 and the inner axle 42 to releasably prevent relative rotation of the inner axle 42 within the internal bore 40d when the inner axle 42 is in the installed position. The transverse threaded bores 40e extend between an external surface of the outer axle 40 and the internal bore 40d. Even though two set screws 46 and two transverse threaded bores 40e are illustrated herein, one set screw 46 and one transverse threaded bore 40e may be provided.

Referring to FIGS. 2-4 and 6-9, the inner axle 42 basically includes a first threaded end 42a, a second end 42b, an inner rod portion 42c and a bracket 48. The first threaded end 42a is threadedly attached to the threaded section 40f of the internal bore 40d. The first threaded end 42a and the threaded section 40f constitute parts of the threaded connection 44 when coupled together. The a second end 42b extends out of the unthreaded section 40g of the internal bore 40d. The second end 42b supports the head member 32 and the lever member 34. Specifically, the second end 42b of the inner axle 42 has the bracket 48 attached thereto, which supports the head member 32 and the lever member 34. The inner rod portion 42c extends between the first and second ends 42b and 42c.

Figure 3:
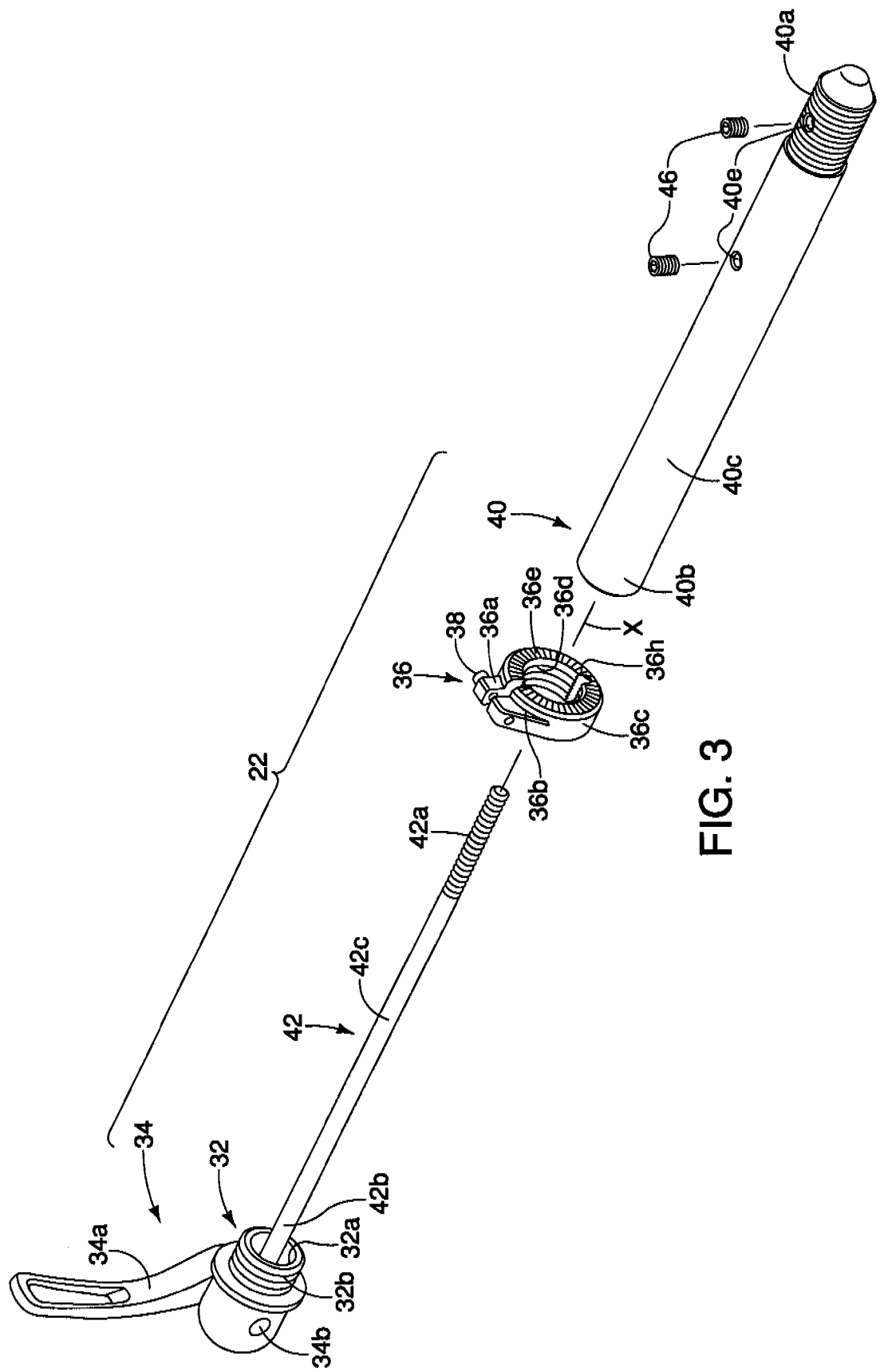
FIG. 3 is an exploded, perspective view of the wheel securing axle of the rear hub illustrated in FIG. 2.
Figure 4:
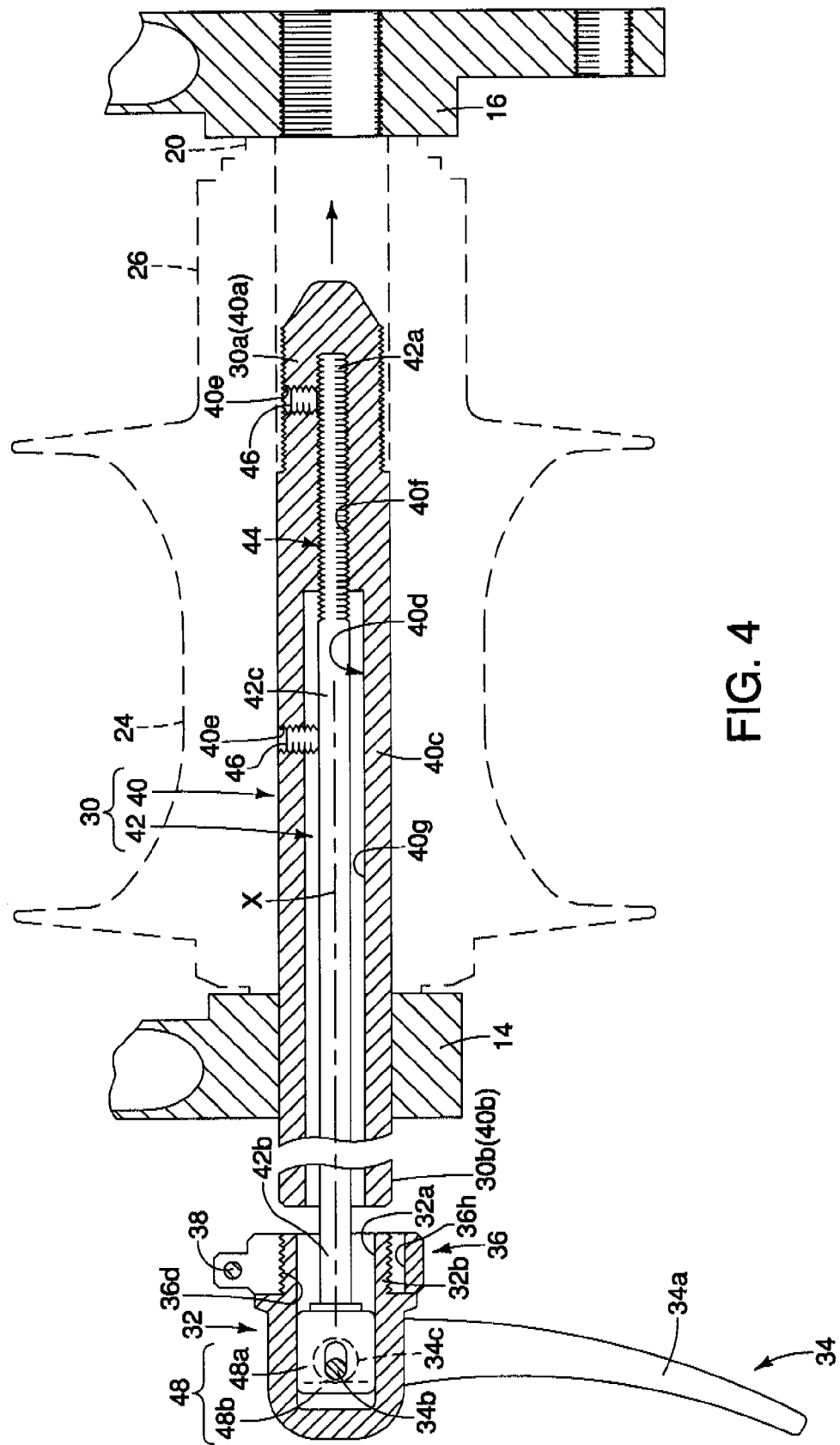
FIG. 4 is an enlarged, partial cross-sectional view of a portion of the frame and the rear hub illustrated in FIG. 1, with the wheel securing axle in a first, partially installed position.
Figure 5:
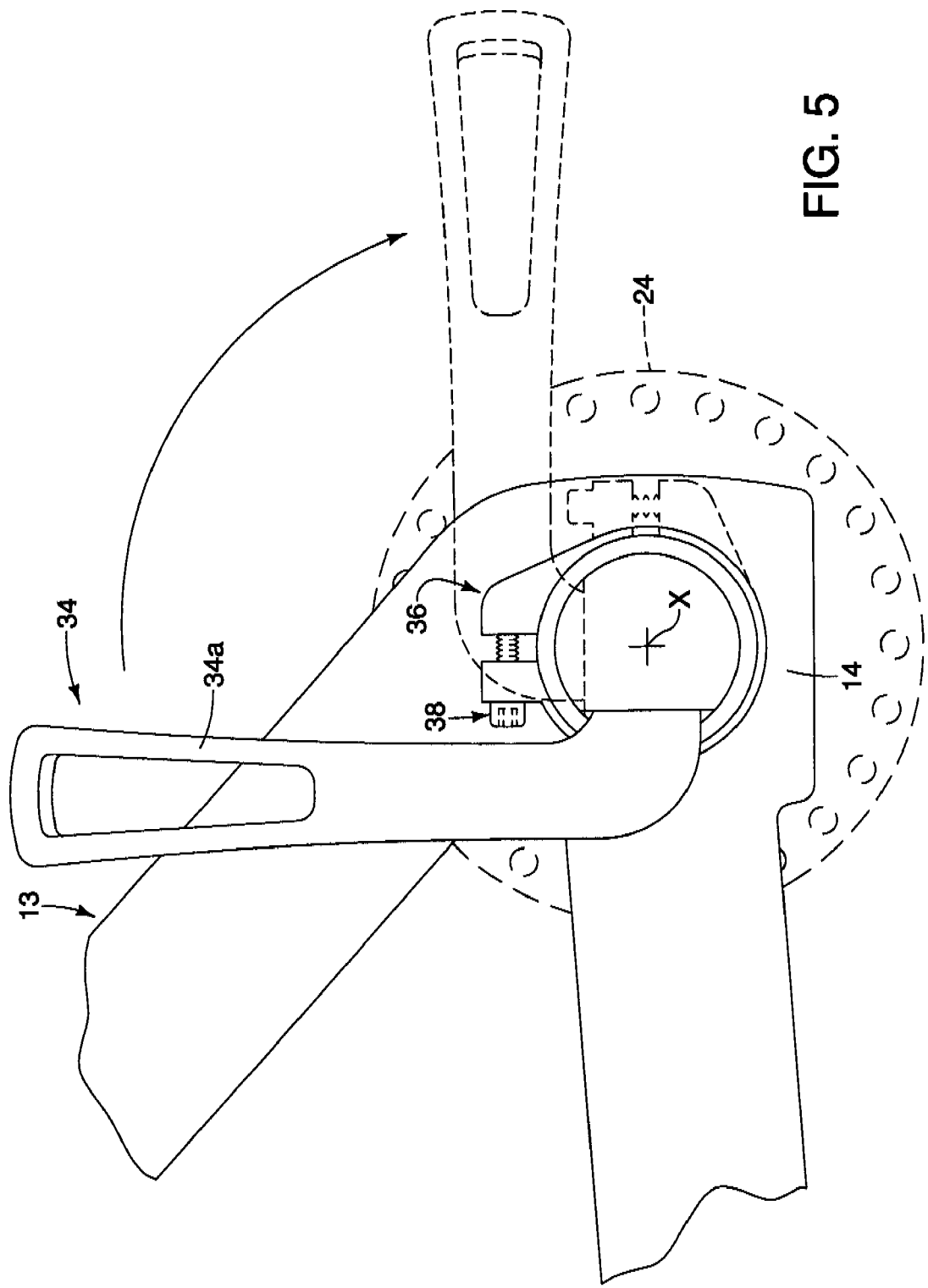
FIG. 5 is an enlarged, end elevational view of the portion of the frame and the rear hub illustrated in FIG. 4, illustrating rotation of the wheel securing axle from the first, partially installed position.
Figure 6:
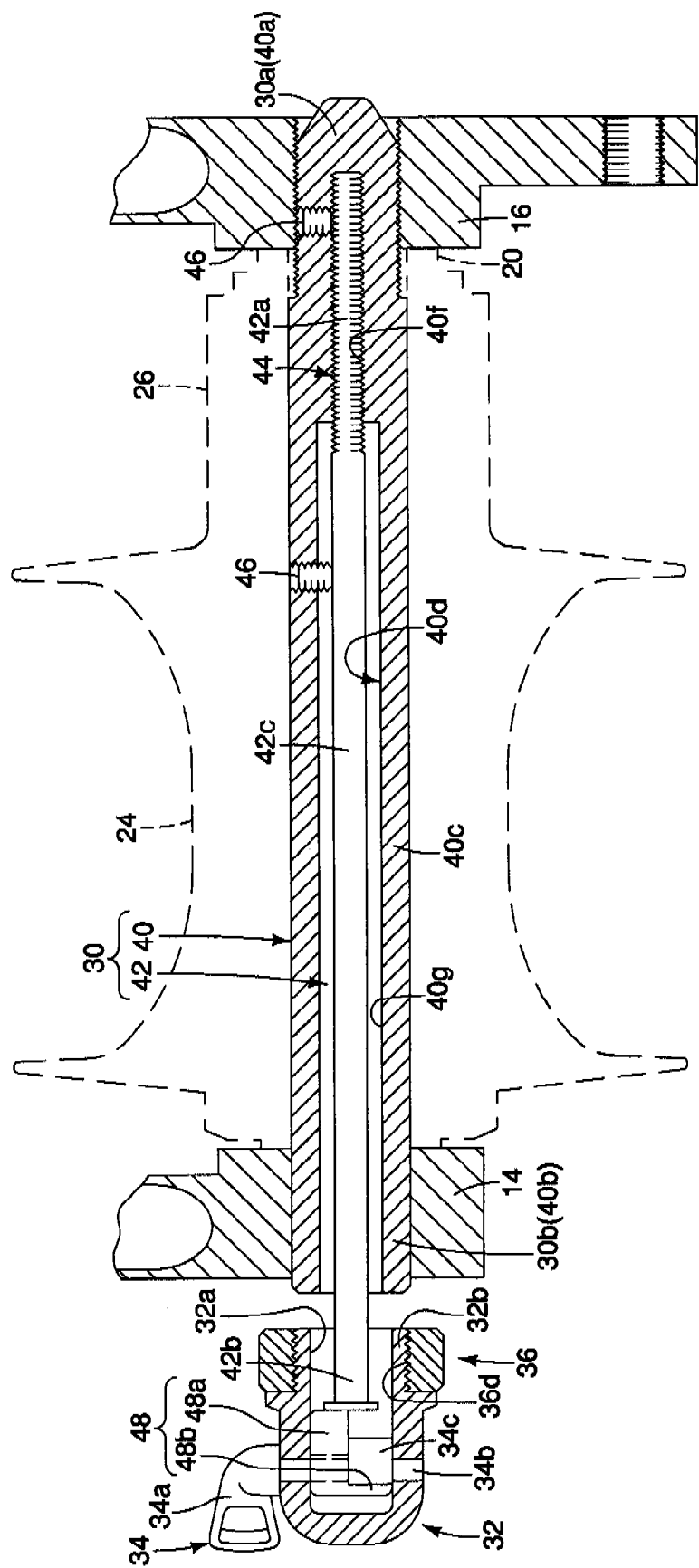
FIG. 6 is an enlarged, partial cross-sectional view of a portion of the frame and the rear hub illustrated in FIG. 1, with the wheel securing axle in a second, partially installed position (i.e. during rotation as illustrated in FIG. 5)

The inner axle 42 preferably has a circular shape as viewed along the center axis X, except for the bracket 48 arranged on the second end 42b, which extends out of the internal bore 40d, as best understood from FIGS. 3, 4 and 6. The inner axle 42 is preferably constructed of a lightweight rigid material such as a metallic material utilizing conventional manufacturing techniques such as casting and/or machining. In this embodiment, the inner axle 42 can constructed as a one-piece, unitary member together with the bracket 48, or the bracket 48 can be constructed as a separate member that is fixed to the inner axle 42 (e.g. by welding or the like).

The bracket 48 preferably includes a support portion 48a with a longitudinal slot, and a cam portion 48b in an L-shaped configuration. The support portion 48a with the slot receives part of the lever member 34 therethrough, as explained below. The cam portion 48b that has a cam surface that cooperates with a cam surface of the lever member 34 to move the inner axle 42 of the shaft member 30 in an axial direction relative to the head member 32 in response to movement of the lever member 34 from a release position shown in FIG. 7 to fixing position shown in FIG. 8. The bracket 48 is relatively conventional, and thus, will not be explained and/or illustrated in further detail herein.

The set screws 46 are arranged to selectively contact an external surface of the inner axle 42 when the set screws 46 are tightened, as shown in FIGS. 4 and 6-8. Specifically, the set screws 46 are threadedly (adjustably) mounted in the transverse threaded bores 40e, as mentioned above. Thus, the ends of the set screws 46 frictionally prevent rotation of the inner axle 42 relative to the outer axle 40 when tightened against the external surface of the inner axle 42. Optionally, the external surface of the inner axle 42 may include one or more recesses or dented areas 42d, such as those illustrated in FIG. 9. With such an arrangement, the inner axle 42 can further be prevented from rotating relative to the outer axle 40 when the internal ends of the set screws 46 are received in the dented areas 42d.

Figure 7:
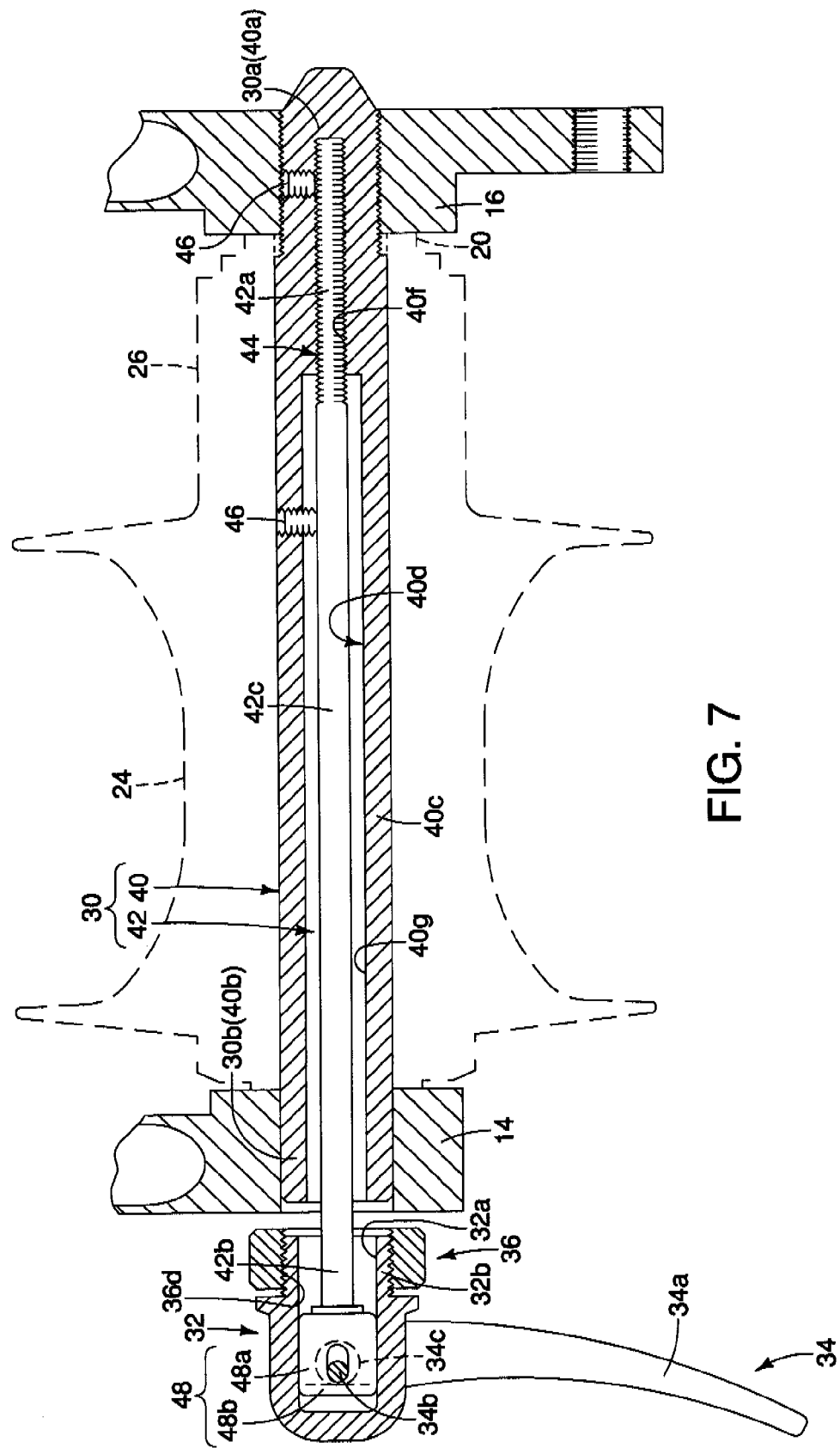
FIG. 7 is an enlarged, partial cross-sectional view of a portion of the frame and the rear hub illustrated in FIG. 1, with the wheel securing axle in a third, partially installed position (i.e. after rotation as illustrated in FIGS. 5 and 6) but prior to clamping the frame using the wheel securing lever.

Referring to FIGS. 2-8, the lever member 34 basically includes an operating lever portion 34a, a pivot pin portion 34b and a cam portion 34c. The cam portion 34c rotates with the operating lever portion 34a and contacts a cam surface of the cam portion 48b of the bracket 48. The cam surface of the cam portion 34c cooperates with the cam surface of the cam portion 48b during rotation of the operating lever portion 34a to move the head member 32 axially closer to the threaded connection 44 when the operating lever portion 34a is rotated from the release position to the fixing position, as seen in FIGS. 7 and 8, respectively. The pivot pin portion 34b is rotatably supported by the head member 32 in one or more holes in a conventional manner. The pivot pin portion 34b is also rotatably supported and longitudinally slidably supported by the support portion 48a of the bracket 48. Specifically, the pivot pin portion 34b is disposed within the slot of the support portion 48a. The lever member 34 is relatively conventional, and thus, will not be discussed and or illustrated in further detail herein.

Referring still to FIGS. 2-8, the head member 32 is basically a cup-shaped member having an internal recess 32a and a threaded section 32b. The bracket 48 of the inner axle 42 is received in the recess 32a. Also, the cam portion 34c is received in the recess 32b. The pivot pin portion 34b, extending from the operating lever portion 34a, extends in a transverse direction through the head member 32 and through the support portion 48a of the bracket 48, which is disposed within the recess 32a. The lever member 34 is preferably spaced axially outwardly from the threaded section 32b along the center axis X.

The threaded section 32b preferably has a tubular configuration with external (male) threads. The adjustment member 36 is threaded onto the externally threaded section 32b. Preferably, the externally threaded section 32b has an axial length that is the same as or slightly smaller than an axial length of the adjustment member 36 so that the adjustment member 36 will contact the mounting flange 14 in a fully assembled state, as shown in FIG. 8. In other words, the threaded section 32b alone does not contact the mounting flange 14.

Referring now to FIGS. 2-8 and 11-13, the adjustment member 36 will now be explained in more detail. The adjustment member 36 is threadedly mounted on the externally threaded section 32b, as mentioned above. Thus, the adjustment member 36 is axially adjustably coupled to the head member 32 by rotating the adjustment member 36 relative to the head member 32. The adjustment member 36 basically has a split ring or C-shaped configuration. The adjustment member 36 basically includes a first free end 36a, a second free end 36b, a curved connecting portion 36c with an internal (female) threaded bore 36d, an axially facing abutment surface 36e, and a tightening element 38. The threaded bore 36d extends axially through the adjustment member 36. The axially facing abutment surface 36e is formed on an end of the adjustment member facing the threaded connection 44. The tightening element 38 is preferably coupled between the first and second ends 36a and 36b to selectively prevent rotation of the adjustment member 36, as explained below.

The adjustment member 36 is preferably constructed of a lightweight rigid material such as a metallic material utilizing conventional manufacturing techniques such as casting and/or machining. The first end 36a, the second end 36b and the connecting portion 36c of the adjustment member 36 are preferably integrally formed together as a one-piece, unitary member. The tightening element 38 is preferably formed as a separate member from the first end 36a, the second end 36b and the connecting portion 36c of the adjustment member 36.

Figure 13:
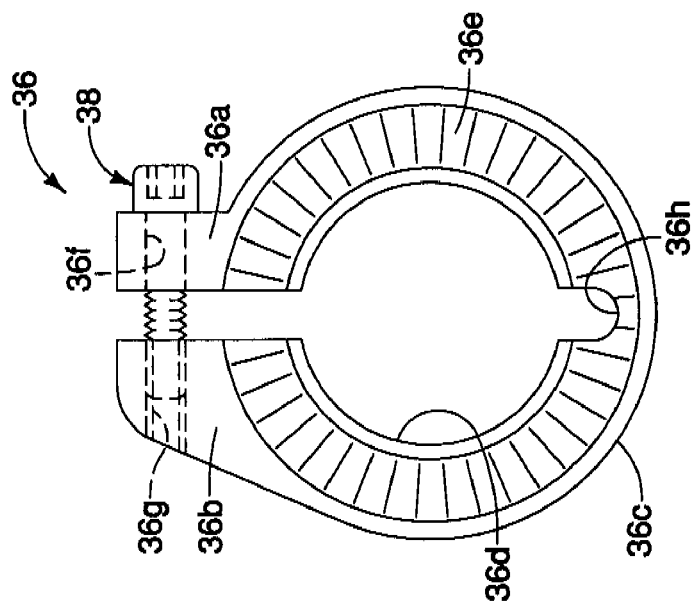
FIG. 13 is an inner end elevational view of the adjustment member illustrated in FIGS. 11 and 12.
Figure 12:
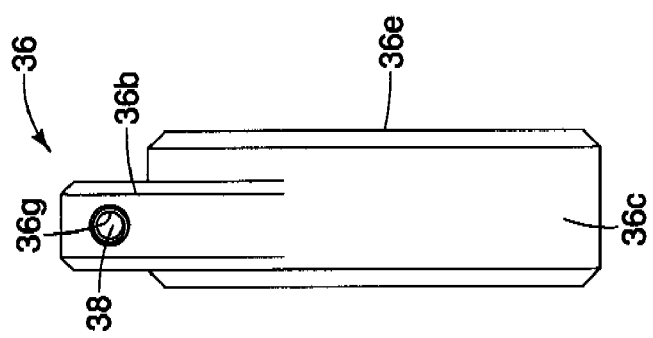
FIG. 12 is a side elevational view of the adjustment member illustrated in FIG. 11.
Figure 11:
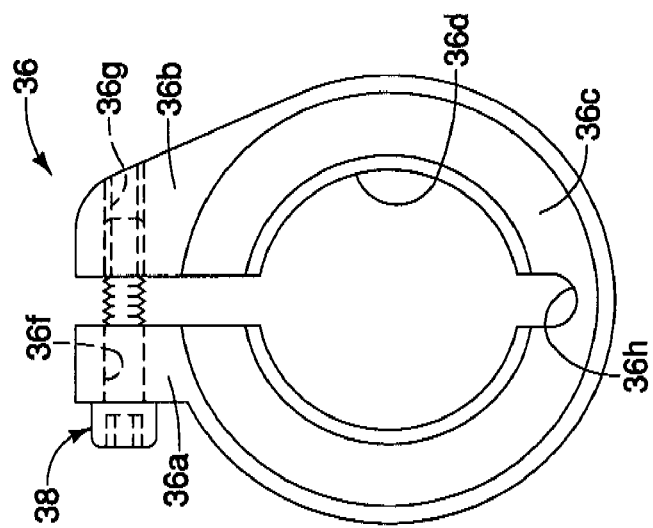
FIG. 11 is a further enlarged, outer end elevational view of the adjustment member of the wheel securing axle illustrated in FIGS. 2-8.

The first end 36a of the adjustment member 36 preferably has an unthreaded through bore 36f that is aligned with a threaded bore 36g of the second end 36b, as best seen in FIGS. 11-13. The tightening element 38 is preferably a threaded bolt or screw with a threaded shaft an enlarged head. The shaft of the tightening element 38 extends through the through bore 36f and into the threaded bore 36g to adjustably attach the first and second free ends 36a and 36b together. The head of the tightening element 38 contacts the first free end 36a of the adjustment member 36.

When the tightening element 38 is tightened (rotated to extend further into the threaded bore 36g), the internal diameter of the threaded bore 36d is reduced. On the other hand, when the tightening element 38 is loosened (rotated in the opposite direction to extend less into the threaded bore 36g), the internal diameter of the threaded bore 36d is increased. The threaded internal bore 36d preferably includes an axially extending notch 36h formed therein to facilitate tightening of the tightening element 38 to reduce the internal diameter of the threaded internal bore 36d.

If the internal diameter of the threaded bore 36d is reduced a predetermined amount by the tightening element 38, friction between the threaded bore 36d and the external threaded section 32b of the head member 32 prevents rotation of the adjustment member 36 relative to the head member 32. On the other hand, if the internal diameter of the threaded bore 36d is increased a predetermined amount by the tightening element 38, friction between the threaded bore 36d and the external threaded section 32b of the head member 32 is negligible such that free rotation of the adjustment member 36 relative to the head member 32 is permitted. In other words, varying degrees of frictional engagement between the adjustment member 36 and the head member 32 can be provided depending on how tight the tightening element 38 is (i.e., how much the tightening element 38 is rotated). Preferably, once the adjustment member 36 is located in the desired position on the head member 32 (i.e., relative to the mounting flange 14), the tightening element 38 is tightened enough to prevent rotation of the adjustment member 36 relative to the head member 32.

Because the axial position of the adjustment member 36 relative to the head member 32 is adjustable, the axial position of the abutment surface 36e of the adjustment member 36 can be adjusted relative to the head member 32. Thus, the axial position of the abutment surface 36e can be adjusted relative to the shaft member 30. The abutment surface 36e is preferably a textured surface configured to frictionally engage the mounting flange 14. The configuration of the textured axially facing abutment surface 36e is illustrated as a plurality of radially extending rigdes/valleys. However, it will be apparent to those skilled in the bicycle art from this disclosure that the abutment surface 36e can have other configurations as needed and/or desired.

Referring now to FIGS. 2-13, assembly and use of the rear hub 12 having the wheel securing axle 22 in accordance with the present invention will now be explained in more detail. Prior to mounting the rear hub 12 having the wheel securing axle 22 to the mounting flanges 14 and 16, the main hub axle 20, the hub assembly 24 and the free wheel 26 are assembled together as a unit in a conventional manner. The wheel securing axle 22 is assembled as a separate unit from the unit including the main hub axle 20, the hub assembly 24 and the free wheel 26 in accordance with the present invention.

In order to assemble the wheel securing axle 22 as a unit, the wheel securing mechanism (i.e., the head member 32, the lever member 34 and the inner axle 42) is assembled using conventional assembly techniques, as seen in FIGS. 3 and 9. The adjustment member 36 can be threaded onto the head member 32 before or after assembling the wheel securing mechanism (i.e., the head member 32, the lever member 34 and the inner axle 42), as best understood from FIG. 3. The inner axle 42 is then inserted into the internal bore 40d and threadedly attached to the outer axle 40 such that axial removal of the inner axle 42 is prevented, as best understood from FIGS. 3 and 4. Then one or more set screws 46 are coupled between the outer axle 40 and the inner axle 42 to prevent rotation of the inner axle 42 relative to the outer axle 40, as best understood from FIGS. 3 and 4. Now, the shaft member 30 is fully assembled.

The unit including the main hub axle 20, the hub assembly 24 and the free wheel 26 can now be attached to the mounting flanges 14 and 16 using the wheel securing axle 22. In order to mount the rear hub 12 to the frame 11, the unit including the main hub axle 20, the hub assembly 24 and the free wheel 26 is positioned between the mounting flanges 14 and 16. The wheel securing axle 22 is then inserted through the hole 14a of the mounting flange 14, through the main hub axle 20, the hub assembly 24 and the free wheel 26, and threaded into the threaded hole 16a of the mounting flange 16a, as best understood from FIGS. 4-7. Now, the adjustment member 36 is axially adjusted relative to the head member 32 such that moving the lever member 34 from the release position (FIG. 7) to the fixing position (FIG. 8) tightly clamps the mounting flange 14. Once the desired position of the adjustment member 36 is determined, the tightening element 38 can be tightened. By adjusting the axial position of the adjustment member 36, the final position of the lever portion 34a when the lever member 34 is completely in the fixing position can also be adjusted. Thus, a user can adjust the final position of the lever portion 34a as he/she wants, e.g. such that the lever member 34 is not accidentally in the release position by hitting against a foreign object (such as rocks, undulation of the ground or the like) during a bicycle ride.

If the rear wheel needs to be removed, the lever member 34 is moved to the release position, and then the entire wheel securing axle 22 is rotated to detach the shaft 30 from the mounting flange 16. Then the entire wheel securing axle 22 can be axially removed, and the remainder of the rear wheel can be removed from the rear triangle 13 of the bicycle frame 11. The installation procedure above can be repeated to reattach the rear hub 12 to the bicycle frame 11. While not illustrated herein, the wheel securing axle 22 can be rotated such that the abutment formed between the threaded end 30a and the outer rod portion 40c contacts the mounting flange 16. With such an arrangement, the shaft member 30 can be located in the same position relative to the mounting flange 16 (i.e. if fully tightened) every time it is installed. With such an arrangement, it is possible to leave the adjustment member 36 in the same position when removing and reinstalling the rear hub 12.

The threaded connection 44 disposed between the outer axle 40 and the inner axle 42 form part of a fixing structure of the shaft member 30 (disposed between the outer axle 40 and the inner axle 42), which releasably prevents axial removal of the inner axle 42 from the internal bore 40d when the inner axle 42 is in the installed position. The set screws 46 mounted in the transverse threaded holes 40e of the outer axle 40 and the external surface of the inner axle 42 also form part of the fixing structure of the shaft member 30 (disposed between the outer axle 40 and the inner axle 42), which releasably prevents relative rotation of the inner axle 42 within the internal bore 40d when the inner axle 42 is in the installed position.

Second Embodiment

Figure 14:
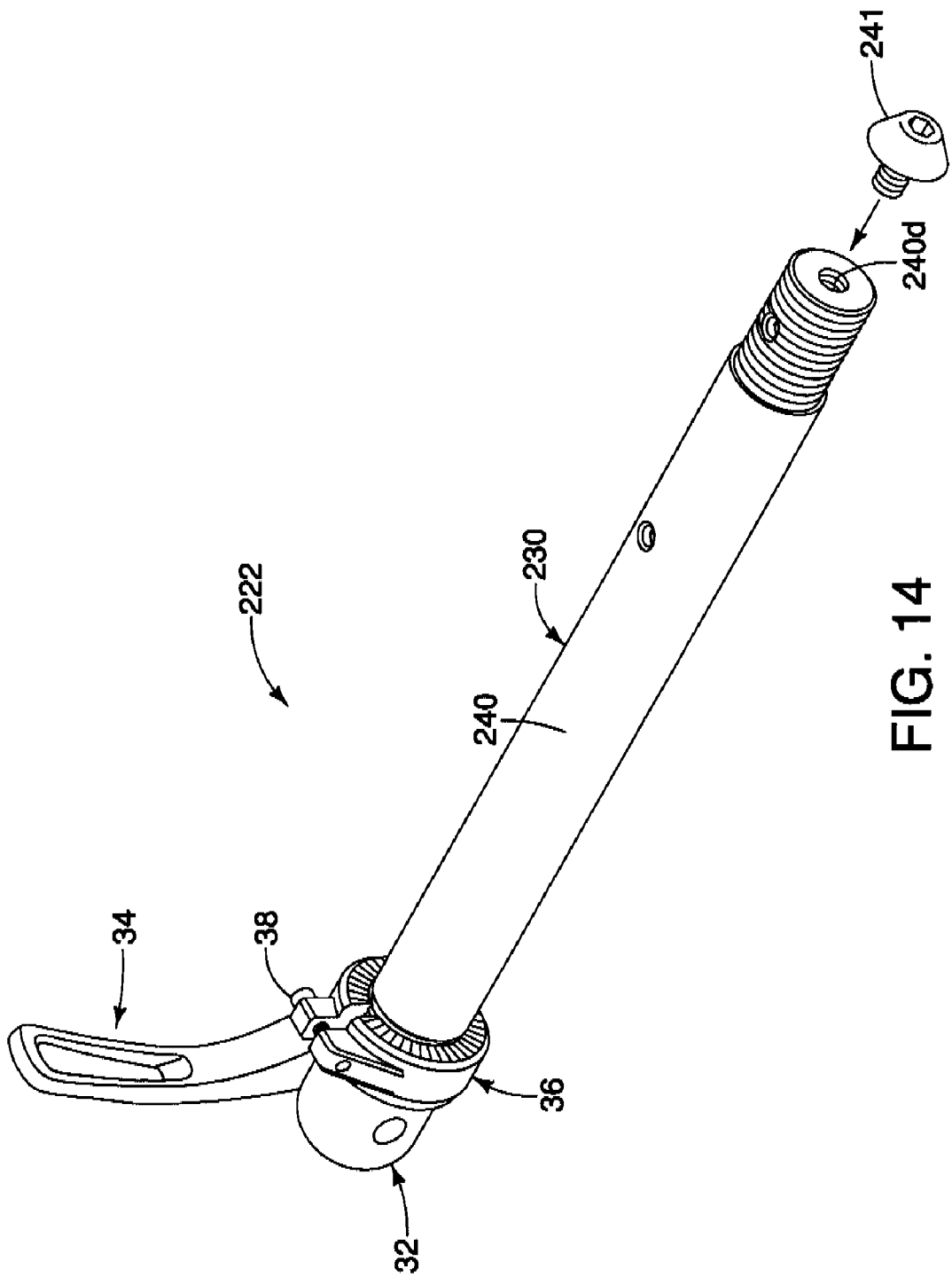
FIG. 14 is an enlarged perspective view of a bicycle wheel securing axle in accordance with a second embodiment of the present invention.

Referring now to FIG. 14, a wheel securing axle 222 having a modified shaft member 230 with a modified outer axle 240 in accordance with a second embodiment of the present invention will now be explained. The wheel securing axle 222 of this second embodiment is identical to the wheel securing axle 22 of the first embodiment, except for the outer axle 240 of the shaft member 230. Accordingly, this second embodiment will not be discussed and/or illustrated in detail herein, except as related to the outer axle 240. However, it will be apparent to those skilled in the bicycle art from this disclosure that the descriptions and illustrations of the first embodiment also apply to this second embodiment, except as explained and/or illustrated herein. Moreover, it will be apparent to those skilled in the bicycle art from this disclosure that the wheel securing axle 222 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this second embodiment that are identical to parts of the first embodiment will be identified with same reference characters as the first embodiment for the sake of convenience. Parts of this second embodiment that are functionally identical (but not exactly identical) to parts of the first embodiment will be identified with the same reference characters but with "200" added thereto for the sake of convenience.

The outer axle 240 in this second embodiment includes a modified internal bore 240d that is a through bore rather than a blind bore as in the first embodiment. Otherwise, the internal bore 240d has a configuration identical to the internal bore 40d of the first embodiment. An end cap (fastening member) 241 such as a threaded bolt is attached to the free end of the outer axle 240 within the internal bore 240d. Other than the modified internal bore 240d and the end cap 241, the outer axle 240 is identical to the outer axle 40 of the first embodiment. The conical surface of the end cap 241 works as a guide portion to make the insertion of the shaft member 230 into the threaded bore 16a of the mounting flange 16 easy/accurate.

Third Embodiment

Figure 15:
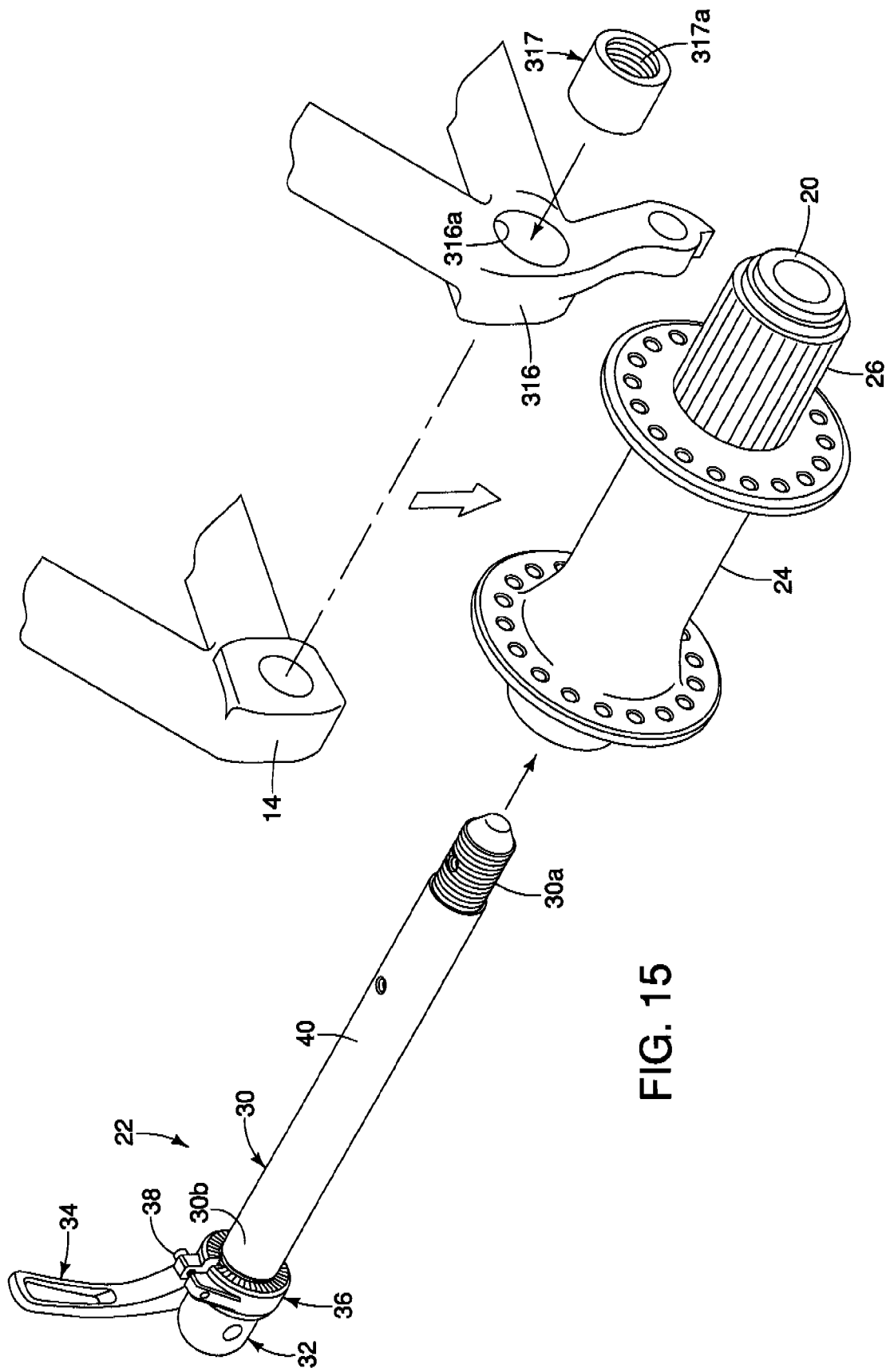
FIG. 15 is an enlarged, exploded perspective view of a portion of a frame and a rear hub in accordance with a third embodiment of the present invention.

Referring now to FIG. 15, mounting the rear hub 12 with the wheel securing axle 22 of the first embodiment to a modified mounting flange 316 in accordance with a third embodiment of the present invention will now be explained. The mounting flange 316 of this third embodiment is identical to the mounting flange 16 of the first embodiment, except the mounting flange 316 includes a larger, unthreaded opening 316a with an adapter 317 received therein. Accordingly, this third embodiment will not be discussed and/or illustrated in detail herein, except as related to the mounting flange 316 and the adapter 317. However, it will be apparent to those skilled in the bicycle art from this disclosure that the descriptions and illustrations of the first embodiment also apply to this third embodiment, except as explained and/or illustrated herein. Moreover, it will be apparent to those skilled in the bicycle art from this disclosure that mounting flange 316 with the adapter 317 is designed to replace the mounting flange 16 of the first embodiment to mount the unit including the main hub axle 20, the hub assembly 24 and the free wheel 26 to the frame 11 using the wheel securing axle 22.

Parts of this third embodiment that are identical to parts of the first embodiment will be identified with same reference characters as the first embodiment for the sake of convenience. Finally, parts of this third embodiment that are functionally identical (but not exactly identical) to parts of the first embodiment will be identified with the same reference characters but with "300" added thereto for the sake of convenience.

The adapter 317 is mounted in the hole 316a of the mounting flange 316. The adapter 317 has in internal (female) threaded bore 317a having a configuration identical to the threaded bore 16a of the first embodiment to threadedly receive the first threaded end 30a of the shaft member 30. The adapter 317 is preferably non-rotatably mounted in the hole 316a via a press-fit or the like. The adapter 317 is also preferably non-axially movable relative to the mounting flange 316 when mounted in the hole 316a. In other words, the press-fit between the adapter 317 and the hole 316a is preferably sufficiently tight such that the adapter 317 is non-movably fixed within the hole 316a. Of course, it will be apparent to those skilled in the bicycle art from this disclosure that other types of non-rotational and non-axially movable connections between the adapter 317 and the hole 316a are possible if needed and/or desired. Also, it will be apparent to those skilled in the bicycle art from this disclosure that the features of this embodiment can be applied to any of the other embodiments illustrated herein.

Fourth Embodiment

Figure 16:
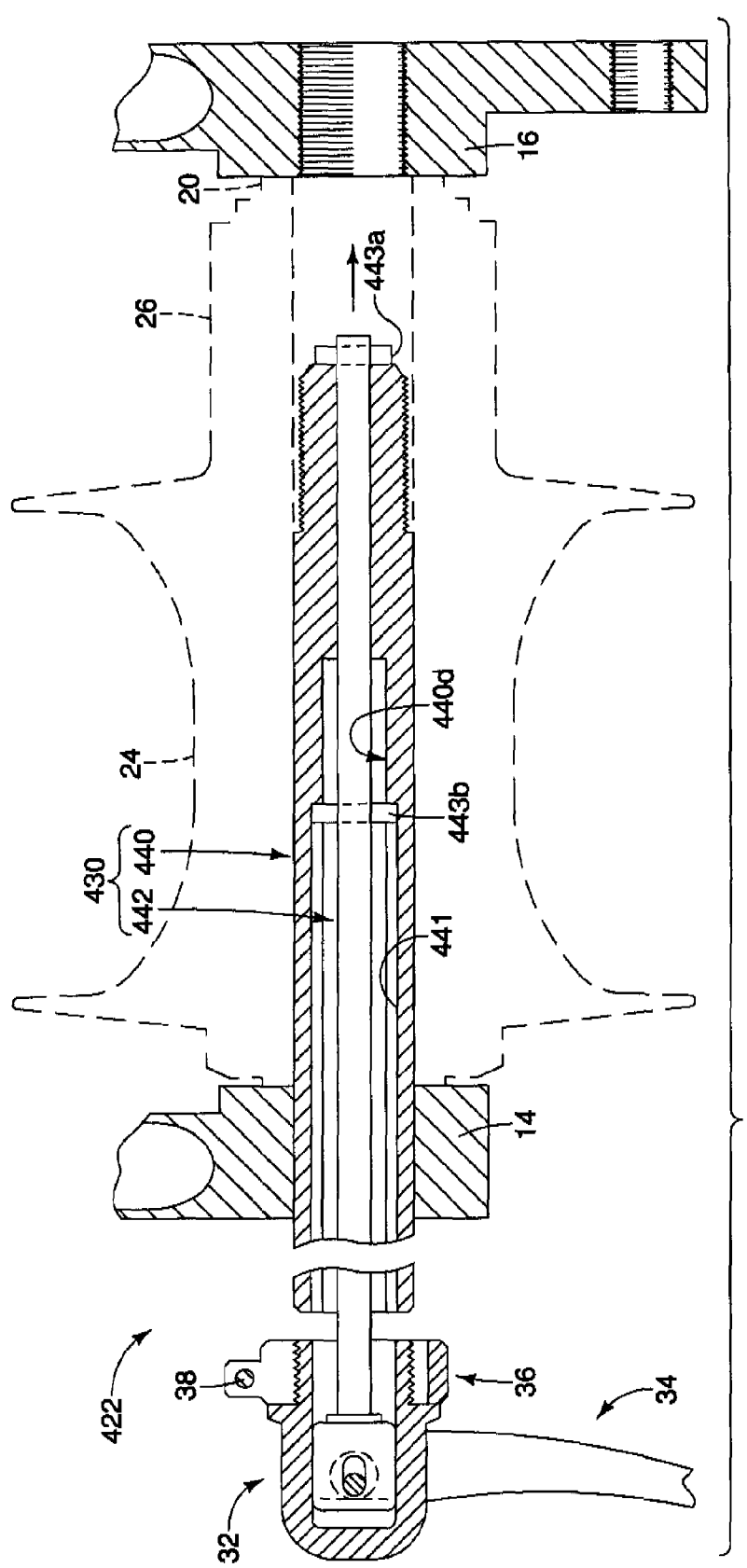
FIG. 16 is an enlarged, partial cross-sectional view of a portion of a frame and a rear hub with a wheel securing axle in accordance with a fourth embodiment of the present invention, with the wheel securing axle in a first, partially installed position.
Figure 17:
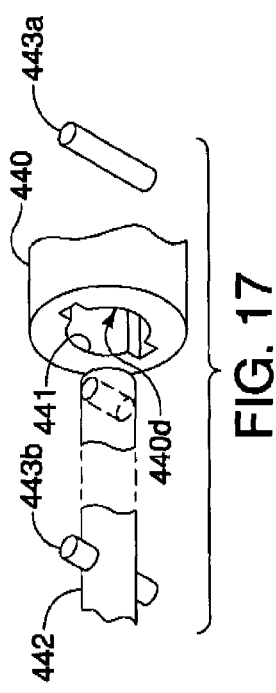
FIG. 17 is an enlarged, partial perspective view of parts of the wheel securing axle illustrated in FIG. 16.

Referring now to FIGS. 16 and 17, a wheel securing axle 422 having a modified shaft member 430 in accordance with a fourth embodiment of the present invention will now be explained. The wheel securing axle 422 of this fourth embodiment is identical to the wheel securing axle 22 of the first embodiment, except for the shaft member 430. Accordingly, this fourth embodiment will not be discussed and/or illustrated in detail herein, except as related to the shaft member 430. However, it will be apparent to those skilled in the bicycle art from this disclosure that the descriptions and illustrations of the first embodiment also apply to this fourth embodiment, except as explained and/or illustrated herein. Moreover, it will be apparent to those skilled in the bicycle art from this disclosure that the wheel securing axle 422 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this fourth embodiment that are identical to parts of the first embodiment will be identified with same reference characters as the first embodiment for the sake of convenience. Parts of this fourth embodiment that are functionally identical (but not exactly identical) to parts of the first embodiment will be identified with the same reference characters but with "400" added thereto for the sake of convenience.

The shaft member 430 includes a modified outer axle 440 and a modified inner axle 442 that are attached together using a modified fixing structure to prevent axial removal of the inner axle 442 from the outer axle 440 and to prevent relative rotation between the inner axle 442 and the outer axle 440. The threaded connection 44 and the set screws 46 of the first embodiment have been eliminated in this fourth embodiment. Instead, in this fourth embodiment, the outer axle 440 includes a stepped internal through bore 440d that is unthreaded and includes a non-circular engagement section 441 configured to non-rotatably engage the inner axle 440. The inner axle 442 has an end pin 443a that is press-fitted in a transverse bore at a free end of the inner axle 442 after inserting the inner axle 442 through the internal bore 440d to prevent axial removal of the inner axle 442 from the outer axle 440. The inner axle 442 also preferably includes an intermediate pin 443b press fitted in a transverse bore prior to inserting the inner axle 442 through the internal bore 440d in order to non-rotatably engage the engagement section 441.

Fifth Embodiment

Figure 18:
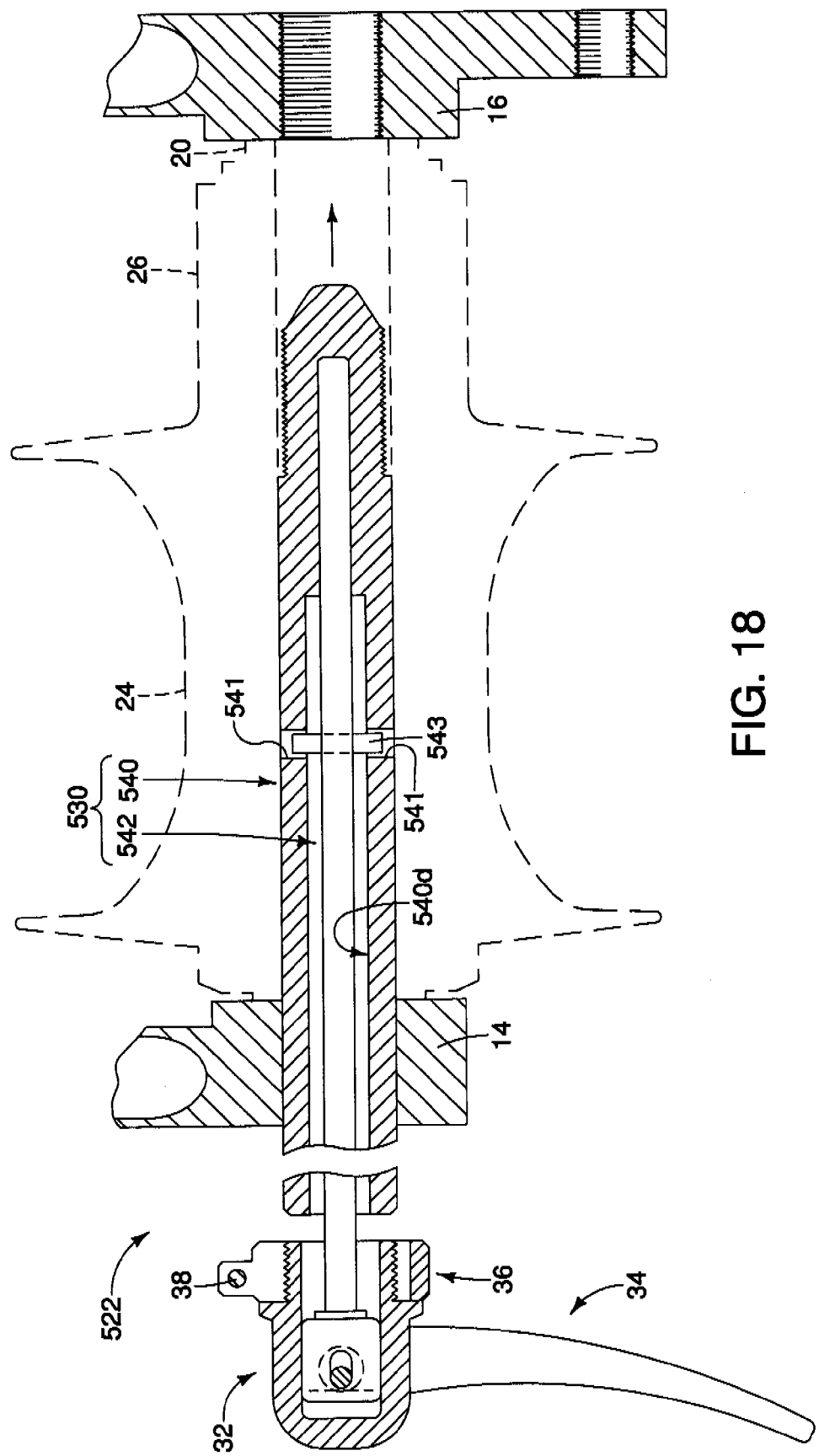
FIG. 18 is an enlarged, partial cross-sectional view of a portion of a frame and a rear hub with a wheel securing axle in accordance with a fifth embodiment of the present invention, with the wheel securing axle in a first, partially installed position.

Referring now to FIG. 18, a wheel securing axle 522 having a modified shaft member 530 in accordance with a fifth embodiment of the present invention will now be explained. The wheel securing axle 522 of this fifth embodiment is identical to the wheel securing axle 22 of the first embodiment, except for the shaft member 530. Accordingly, this fifth embodiment will not be discussed and/or illustrated in detail herein, except as related to the shaft member 530. However, it will be apparent to those skilled in the bicycle art from this disclosure that the descriptions and illustrations of the first embodiment also apply to this fifth embodiment, except as explained and/or illustrated herein. Moreover, it will be apparent to those skilled in the bicycle art from this disclosure that the wheel securing axle 522 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this fifth embodiment that are identical to parts of the first embodiment will be identified with same reference characters as the first embodiment for the sake of convenience. Parts of this fifth embodiment that are functionally identical (but not exactly identical) to parts of the first embodiment will be identified with the same reference characters but with "500" added thereto for the sake of convenience.

The shaft member 530 includes a modified outer axle 540 and a modified inner axle 542 that are attached together using a modified fixing structure to prevent axial removal of the inner axle 542 from the outer axle 540 and to prevent relative rotation between the inner axle 542 and the outer axle 540. The threaded connection 44 and the set screws 46 of the first embodiment have been eliminated in this fifth embodiment. Instead, in this fifth embodiment, the outer axle 540 includes a stepped internal blind bore 540d that is unthreaded and a pair of aligned pin mounting holes 541 extending between an external surface of the outer axle 540 and the internal bore 540d. The inner axle 542 has an intermediate pin 543 (like the pins 443a and 443b of the fourth embodiment) that is press-fitted in a transverse bore that is aligned with the pin mounting holes 541 after inserting the inner axle 542 completely into the internal bore 540d. The intermediate pin 543 engages the pin mounting holes 541 to prevent axial removal of the inner axle 542 from the outer axle 540, and to prevent relative rotation between the inner axle 542 and the outer axle 540.

Sixth Embodiment

Figure 19:
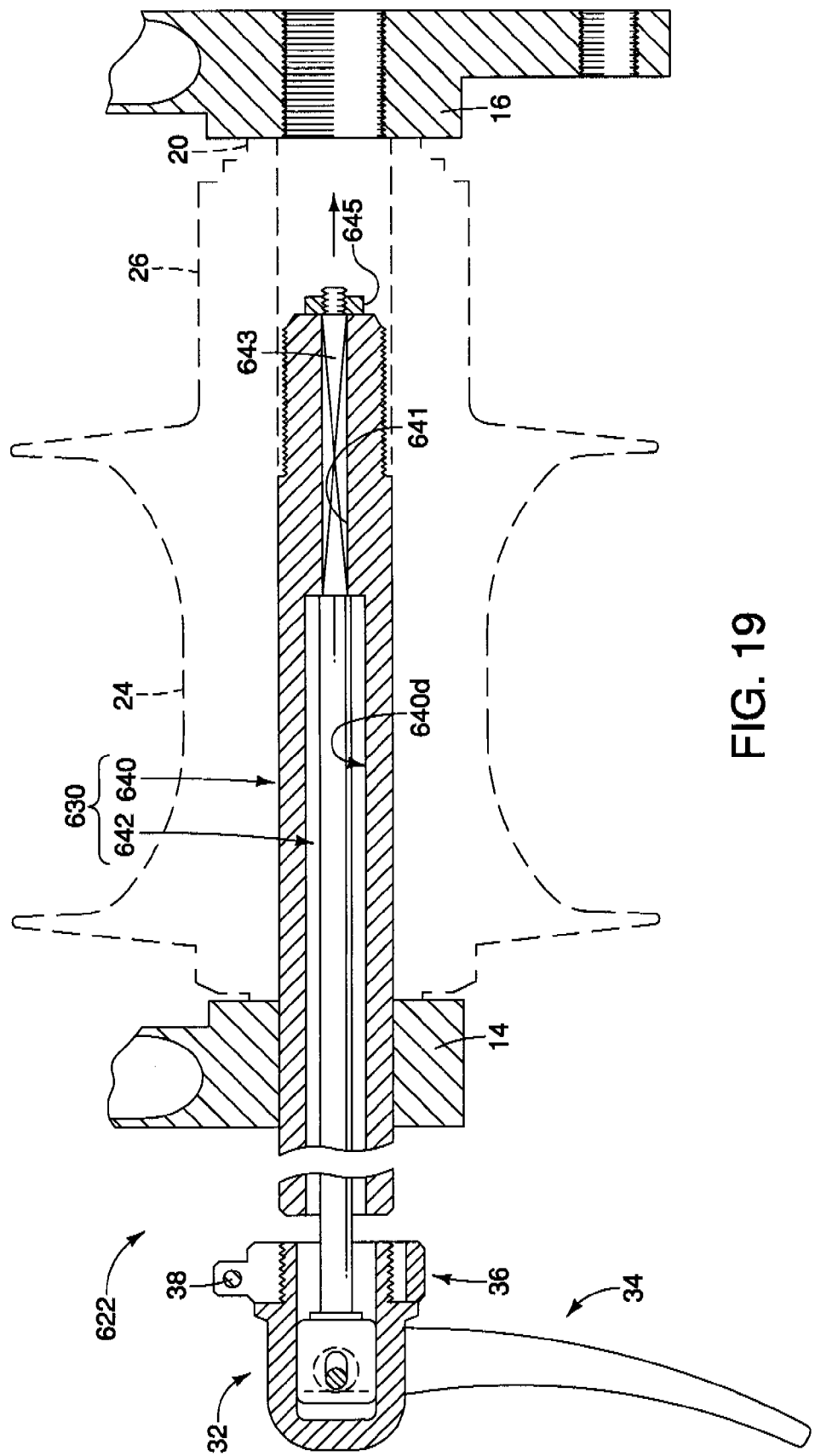
FIG. 19 is an enlarged, partial cross-sectional view of a portion of a frame and a rear hub with a wheel securing axle in accordance with a sixth embodiment of the present invention, with the wheel securing axle in a first, partially installed position.

Referring now to FIG. 19, a wheel securing axle 622 having a modified shaft member 630 in accordance with a sixth embodiment of the present invention will now be explained. The wheel securing axle 622 of this sixth embodiment is identical to the wheel securing axle 22 of the first embodiment, except for the shaft member 630. Accordingly, this sixth embodiment will not be discussed and/or illustrated in detail herein, except as related to the shaft member 630. However, it will be apparent to those skilled in the bicycle art from this disclosure that the descriptions and illustrations of the first embodiment also apply to this sixth embodiment, except as explained and/or illustrated herein. Moreover, it will be apparent to those skilled in the bicycle art from this disclosure that the wheel securing axle 622 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this sixth embodiment that are identical to parts of the first embodiment will be identified with same reference characters as the first embodiment for the sake of convenience. Parts of this sixth embodiment that are functionally identical (but not exactly identical) to parts of the first embodiment will be identified with the same reference characters but with "600" added thereto for the sake of convenience.

The shaft member 630 includes a modified outer axle 640 and a modified inner axle 642 that are attached together using a modified fixing structure to prevent axial removal of the inner axle 642 from the outer axle 640 and to prevent relative rotation between the inner axle 642 and the outer axle 640. The threaded connection 44 and the set screws 46 of the first embodiment have been eliminated in this sixth embodiment. Instead, in this sixth embodiment, the outer axle 640 includes a stepped internal through bore 640d that is unthreaded but includes a non-circular (e.g. square) engagement section 641. The inner axle 642 has a mating non-circular (e.g. square) engagement section 643 that is non-rotatably received in the engagement section 641 when the inner axle 642 is mounted in the internal bore 640d to prevent relative rotation between the inner axle 642 and the outer axle 640. The inner axle 642 further includes a threaded free end that has a nut 645 attached thereto to prevent axial removal of the inner axle 642 from the outer axle 640.

Seventh Embodiment

Referring now to FIGS. 20 and 21, a wheel securing axle 722 having a modified shaft member 730 in accordance with a seventh embodiment of the present invention will now be explained. The wheel securing axle 722 of this seventh embodiment is identical to the wheel securing axle 22 of the first embodiment, except for the shaft member 730. Accordingly, this seventh embodiment will not be discussed and/or illustrated in detail herein, except as related to the shaft member 730. However, it will be apparent to those skilled in the bicycle art from this disclosure that the descriptions and illustrations of the first embodiment also apply to this seventh embodiment, except as explained and/or illustrated herein. Moreover, it will be apparent to those skilled in the bicycle art from this disclosure that the wheel securing axle 722 is designed to replace the wheel securing axle 22 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this seventh embodiment that are identical to parts of the first embodiment will be identified with same reference characters as the first embodiment for the sake of convenience. Parts of this seventh embodiment that are functionally identical (but not exactly identical) to parts of the first embodiment will be identified with the same reference characters but with "700" added thereto for the sake of convenience.

The shaft member 730 includes a modified outer axle 740 and a modified inner axle 742 that are attached together using a modified fixing structure to prevent axial removal of the inner axle 742 from the outer axle 740 and to prevent relative rotation between the inner axle 742 and the outer axle 740. The threaded connection 44 and the set screws 46 of the first embodiment have been eliminated in this seventh embodiment. Instead, in this seventh embodiment, the outer axle 740 includes a stepped internal through bore 740*d* that is unthreaded but includes a non-circular (e.g. square) engagement section 741. The inner axle 742 has a mating non-circular (e.g. square) engagement section 743 that is non-rotatably received in the engagement section 741 when the inner axle 742 is mounted in the internal bore 740*d* to prevent relative rotation between the inner axle 742 and the outer axle 740. The inner axle 742 further includes a free end with an annular recess that has a retainer clip 745 attached thereto to prevent axial removal of the inner axle 742 from the outer axle 740.

Eighth Embodiment

Figure 23:
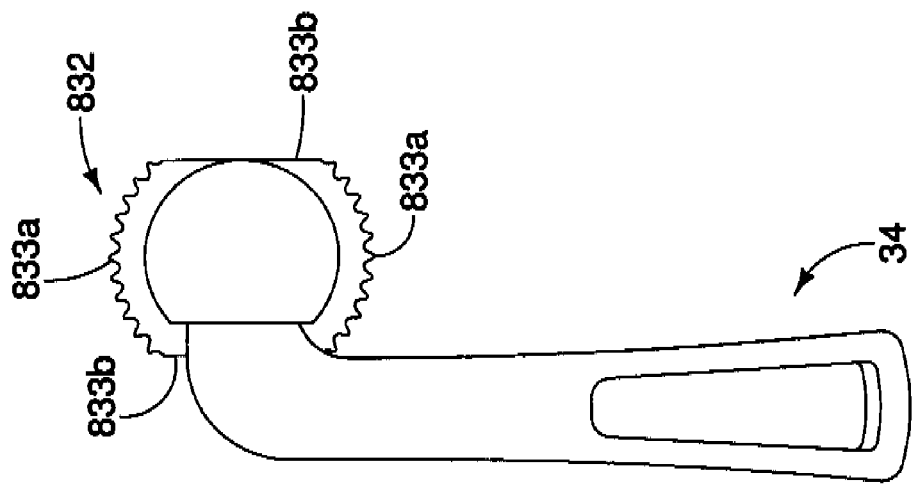
FIG. 23 is an end elevational view of the wheel securing axle illustrated in FIG. 22.
Figure 22:
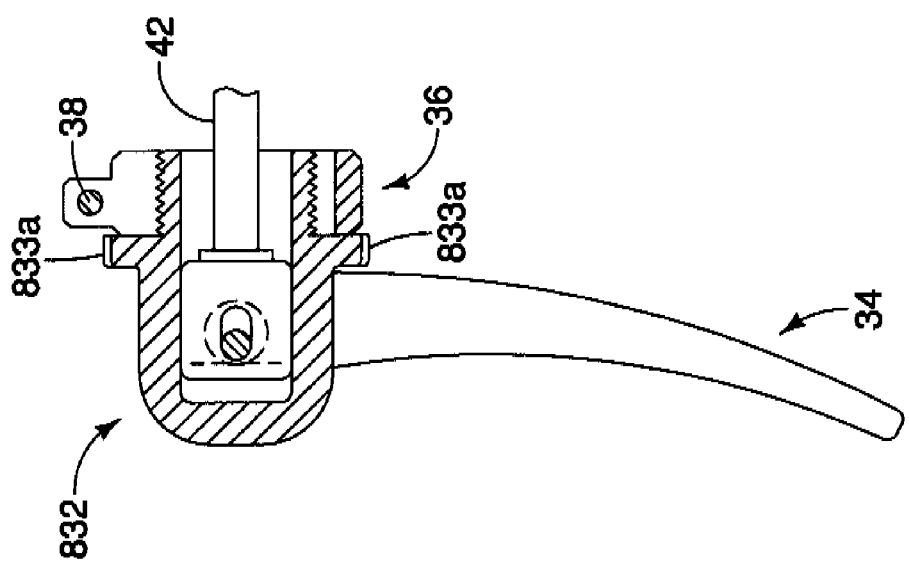
FIG. 22 is an enlarged, partial cross-sectional view of a wheel securing axle in accordance with an eighth embodiment of the present invention.

Referring now to FIGS. 22 and 23, a portion of a wheel securing axle having a modified head member 832 in accordance with an eighth embodiment of the present invention will now be explained. This eighth embodiment is identical to the first embodiment, except for the head member 832. Accordingly, this eighth embodiment will not be discussed and/or illustrated in detail herein, except as related to the head member 832. However, it will be apparent to those skilled in the bicycle art from this disclosure that the descriptions and illustrations of the first embodiment also apply to this second embodiment, except as explained and/or illustrated herein. Moreover, it will be apparent to those skilled in the bicycle art from this disclosure that the head member 832 is designed to replace the head member 32 of the first embodiment to mount the unit including the main hub axle 20, the hub assembly 24 and the free wheel 26 to the frame mounting flanges 14 and 16 in the manner described above with respect to the first embodiment and as illustrated in FIGS. 1-13.

Parts of this eighth embodiment that are identical to parts of the first embodiment will be identified with same reference characters as the first embodiment for the sake of convenience. Parts of this eighth embodiment that are functionally identical (but not exactly identical) to parts of the first embodiment will be identified with the same reference characters but with "800" added thereto for the sake of convenience.

The head member 832 of this eighth embodiment is identical to the head member 32 of the first embodiment, except the head member 832 includes an engagement section with one or more textured gripping areas 833*a* and/or one or more (e.g. flat) tool engagement surfaces 833*b* to facilitate rotation of the head member 832. It will be apparent to those skilled in the bicycle art from this disclosure that a continuous annular textured gripping area can be provided (i.e., the tool engagement surfaces 833*b* can be omitted) or additional tool engagement surfaces 833*b* can be provided (i.e., the gripping areas 833*a* can be omitted) if needed and/or desired. Also, it will be apparent to those skilled in the bicycle art from this disclosure that the features of this embodiment can be applied to any of the other embodiments illustrated herein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle wheel securing structure comprising:
a shaft member having a first threaded end and a second end with a center axis extending therebetween;
a head member movably disposed on the second end of the shaft member;
a lever member operatively mounted to move the shaft member in an axial direction relative to the head member in response to movement of the lever member; and
an adjustment member mounted on the head member to move with the head member in response to movement of the lever member, and the adjustment member being axially adjustably coupled to the head member to move on the head member in an axial direction of the shaft member with respect to the head member, the adjustment member including an abutment surface facing towards the first threaded end of the shaft member with an axial position of the abutment surface of the adjustment member being adjusted in the axial direction of the shaft member in response to axial adjustment of the adjustment member with respect to the head member.

2. The bicycle wheel securing structure according to claim 1, wherein
the shaft member includes an outer axle and an inner axle disposed within an internal bore of the outer axle in an installed position, the head member being attached to an end of the inner axle extending out of the internal bore.

3. The bicycle wheel securing according to claim 2, wherein
the inner axle is threadedly attached within the internal bore of the outer axle.

4. The bicycle wheel securing structure according to claim 2, wherein
the internal bore is a blind bore.

5. The bicycle wheel securing structure according to claim 2, wherein
the shaft member includes a fixing structure disposed between the outer axle and the inner axle to releasably prevent axial removal of the inner axle from the internal bore when the inner axle is in the installed position.

6. The bicycle wheel securing structure according to claim 5, wherein
the fixing structure includes a threaded connection between the outer axle and the inner axle.

7. The bicycle wheel securing structure according to claim 2, wherein
the shaft member includes a fixing structure disposed between the outer axle and the inner axle to releasably prevent relative rotation of the inner axle within the internal bore when the inner axle is in the installed position.

8. The bicycle wheel securing structure according to claim 7, wherein
the fixing structure includes a set screw arranged in a transverse threaded bore of the outer axle, the transverse threaded bore extending between an external surface of the outer axle and the internal bore such that the set screw is releaseably engageable with the inner axle.

9. The bicycle wheel securing structure according to claim 8, wherein
the fixing structure includes a threaded connection between the outer axle and the inner axle.

10. The bicycle wheel securing structure according to claim 7, wherein
the fixing structure includes a threaded connection between the outer axle and the inner axle.

11. The bicycle wheel securing structure according to claim 1, wherein
the adjustment member is threadedly coupled to the head member.

12. The bicycle wheel securing structure according to claim 1, wherein
the head member has an external thread disposed on the second end of the shaft member; and
the adjustment member is threadedly mounted on the external threads of the head member to move in the axial direction of the shaft member.

13. A bicycle wheel securing structure comprising:
a shaft member having a first threaded end and a second end with a center axis extending therebetween;
a head member disposed on the second end of the shaft member;
a lever member operatively mounted to move the shaft member in an axial direction relative to the head member in response to movement of the lever member; and
an adjustment member axially adjustably coupled to the head member such that an axial position of an abutment surface of the adjustment member can be adjusted relative to the shaft member, the adjustment member being threadedly coupled to the head member, the adjustment member having a split ring configuration with a pair of free ends.

14. The bicycle wheel securing structure according to claim 13, wherein
the adjustment member includes a tightening element coupled between the free ends thereof that is configured and arranged to prevent rotation of the adjustment member relative to the head member when the tightening member is tightened.

15. The bicycle wheel securing structure according to claim 14, wherein
the adjustment member has female threads with an axially extending notch formed therein.

16. The bicycle wheel securing structure according to claim 14, wherein
the tightening element is a screw threadedly attached to at least one of the free ends of the adjustment member to reduce an internal diameter of the adjustment member upon rotating the screw in one rotational direction.

* * * * *